United States Patent
Thomas

(10) Patent No.: US 7,495,847 B2
(45) Date of Patent: Feb. 24, 2009

(54) SCOPE WITH PUSH-IN WINDAGE/ELEVATION RESET

(75) Inventor: Mitchell Thomas, Klamath Falls, OR (US)

(73) Assignee: YT Products, LLC, Sisters, OR (US)

( * ) Notice: Subject to any disclaimer, the term of this patent is extended or adjusted under 35 U.S.C. 154(b) by 199 days.

(21) Appl. No.: 11/340,423

(22) Filed: Jan. 26, 2006

(65) Prior Publication Data

US 2006/0268433 A1    Nov. 30, 2006

Related U.S. Application Data

(60) Provisional application No. 60/647,686, filed on Jan. 27, 2005, provisional application No. 60/647,200, filed on Jan. 26, 2005.

(51) Int. Cl.
G02B 7/02    (2006.01)
(52) U.S. Cl. .......................................... 359/811; 42/122
(58) Field of Classification Search ................. 359/694, 359/811, 819; 42/111, 112, 122
See application file for complete search history.

(56) References Cited

U.S. PATENT DOCUMENTS

2003/0192224 A1* 10/2003 Kirk ............................ 42/124
2006/0107580 A1   5/2006  Thomas et al.
2006/0216784 A1   9/2006  Paegle et al.
2006/0254115 A1  11/2006  Thomas et al.
2006/0286640 A1  12/2006  Paegle et al.
2007/0062091 A1   3/2007  Thomas et al.

* cited by examiner

Primary Examiner—Timothy J Thompson
(74) Attorney, Agent, or Firm—Timothy E. Siegel Patent Law, PLLC

(57) ABSTRACT

Certain embodiments described herein comprise a scope for mounting on a firearm to provide a sight. This scope is adjustable in at least one of elevation and windage. The scope comprises a main tube, imaging optics in the main tube, a movable optic assembly that holds at least a portion of the optics; and an adjustable mechanism configured to adjust the position of the movable optics assembly. The adjustment mechanism comprises a rotatable adjustment knob, an adjustment screw, and a biasing element that biases the adjustment screw with respect to the adjustment knob. In an engagement position the adjustment knob drivingly engages with the adjustment screw such that rotation of the knob causes rotation of the adjustment screw, and in a depressed position the knob disengages the adjustment screw.

10 Claims, 20 Drawing Sheets

SCOPE WITH PUSH-IN WINDAGE/ELEVATION RESET

PRIORITY APPLICATIONS

This application claims priority to U.S. Provisional Patent Application No. 60/647,200 entitled "Scope with Improved Windage/Elevation System" filed Jan. 26, 2005, as well as U.S. Provisional Patent Application No. 60/647,686 entitled "Adjustable Optical Sighting Apparatus and Methods" filed Jan. 27, 2005.

BACKGROUND

1. Field of the Invention

The present teachings relate to a scope for mounting on a firearm to provide a gun sight. Such a scope may have adjustment capability.

2. Description of the Related Art

Scopes are of interest for practical applications in various fields. Scopes are often used as aiming devices, for example, for firearms like rifles or handguns. Scopes can be mounted to the firearm so that the user can peer through the scope to view the target up close.

A scope, otherwise known as a terrestrial telescope or landscape telescope, comprises an objective lens and an ocular lens or eyepiece. The combination of the objective and the ocular alone create an inverted image of the target in the viewer's eye. Accordingly, scopes are customarily outfitted with erector systems between the objective and ocular for inverting the image such that the target appears erect as seen by the viewer. The objective, ocular, and erector are generally disposed in a body that protects the optics.

Conventional scopes that are mounted on a firearm typically have a rotatable zoom ring disposed on the outside of the scope. The zoom ring can be rotated to adjust optics within the scope that enlarge or reduce the apparent distance to the object viewed through the scope. Thus, when the user employs the scope to aim a firearm at a target, the user can rotate the zoom ring to adjust how close the object appears for easier observation of the target.

The scope may also include windage and elevation controls for adjusting windage and elevation. These controls may comprise dials that the user rotates to establish the desired windage or elevation setting. The windage and elevation controls may include an indicator that indicates the windage and elevation setting. This indicator may be set to zero once the proper windage/elevation adjustment has been established. Preferably, use of the windage and elevation controls, including resetting the windage and elevation indicator, is convenient and easy to use.

SUMMARY

Various embodiments of the invention comprise a scope for mounting on a firearm to provide a sight. The scope is adjustable in at least one of elevation and windage. The scope comprises a main tube, imaging optics in the main tube and a movable optic assembly that holds at least a portion of the optics. The scope further comprises an adjustable mechanism configured to adjust the position of the movable optics assembly. The adjustment mechanism comprises a rotatable adjustment knob, a threaded member, and a biasing element that biases the threaded member with respect to the adjustment knob. In an engagement position, the adjustment knob drivingly engages the threaded member such that rotation of the knob causes rotation of the threaded member. In a depressed position, the knob disengages the threaded member.

Another embodiment of the invention comprises a method of manufacturing a scope for a firearm. The method comprises providing a hollow main tube body, inserting movable optics in the hollow main tube body, and inserting a screw into the main tube body to engage the optics. The method further comprises providing an adjustment knob that is biased with respect to the screw to a first position. The adjustment knob drivingly engaging the screw when in the first position and disengages the screw when in a second position.

Another embodiment of the invention comprises a scope for mounting on a firearm to provide a sight. The scope is adjustable in at least one of elevation and windage. The scope comprises a main tube, imaging optics disposed within the main tube, and an adjustment mechanism coupled to the main tube to adjust the position of the imaging optics. The adjustment mechanism is movable between a first position and a depressed second position. The adjustment mechanism comprises an adjustment knob that has a first coupling element, an elongated body extending through the main tube, and a second coupling element connected to the elongated body. The first coupling element engages the second coupling element when the adjustment mechanism is in the first position such that movement of the adjustment knob causes the elongated body to move through a wall of the main tube. The first coupling element disengages from the second coupling element when the adjustment mechanism is in the depressed second position.

DETAILED DESCRIPTION OF THE CERTAIN PREFERRED EMBODIMENTS

Figure 1:
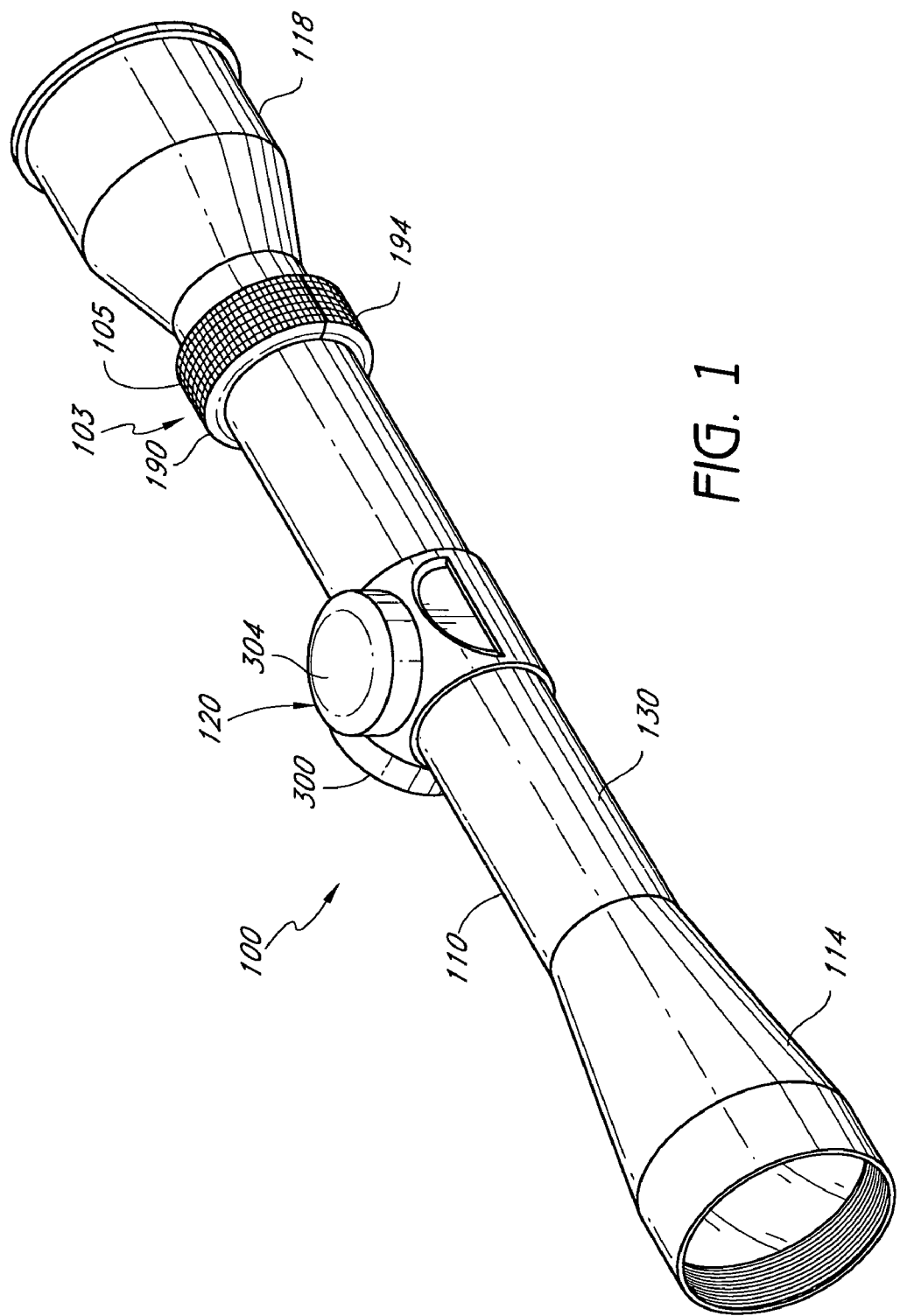
FIG. 1 is a perspective view of a scope having a positioning system for adjusting windage and elevation as well as a zoom assembly for providing zoom.

These and other aspects, advantages, and features of the present teachings will become apparent from the following detailed description and with reference to the accompanying drawings. In the drawings, similar elements have similar reference numerals. To assist the description of the scope and its components, the following coordinate terms are used. The terms proximal and distal, which are used to describe the disclosed embodiments, are used consistently with the description of the exemplary applications. The terms proximal and distal are used in reference to the head of the user looking through the scope. That is, proximal components are nearer to the user than distal components.

FIG. 1 illustrates a scope 100 that has a zoom assembly 103 for providing selectable zoom thereby controlling the apparent distance to an object viewed through the scope. The zoom assembly 103 includes the zoom selector ring 105 that is disposed along and surrounds a main body 110 of the scope 100. The zoom selector ring 105 can be adjusted, e.g., rotated, to zoom in or zoom out, thereby reducing or enlarging the object viewed through the scope 100.

As shown in FIG. 1, in certain preferred embodiments the zoom selector ring 105 is disposed rearward on the main tube 110. The main body 110 has a widened objective end 114 and a widened eyepiece end 118 housing an objective and an eyepiece, respectively. In the illustrated embodiment, the widened eyepiece end 118 is at the proximal end and the widened objective end 114 is at the distal end of the main body 110. The scope 100 also includes a positioning system 120 for manipulating optics contained within the scope 100 to account for windage and/or elevation. The positioning system 120 includes elevation and windage dials 300, 304 for adjusting the elevation and windage as described in more detail below. In the illustrated embodiment, the zoom selector ring 105 is located between the eyepiece end 114 and the positioning system 120. However, the zoom selector ring 105 can be located at any suitable position along the scope 100 for adjusting optics of the scope to achieve the desired amount of zoom. Although not illustrated, the scope 100 can be mounted to a firearm (e.g., a rifle, a handgun, etc.) or any other device (e.g., a crossbow or a bow) that a user aims during operation.

Figure 2:
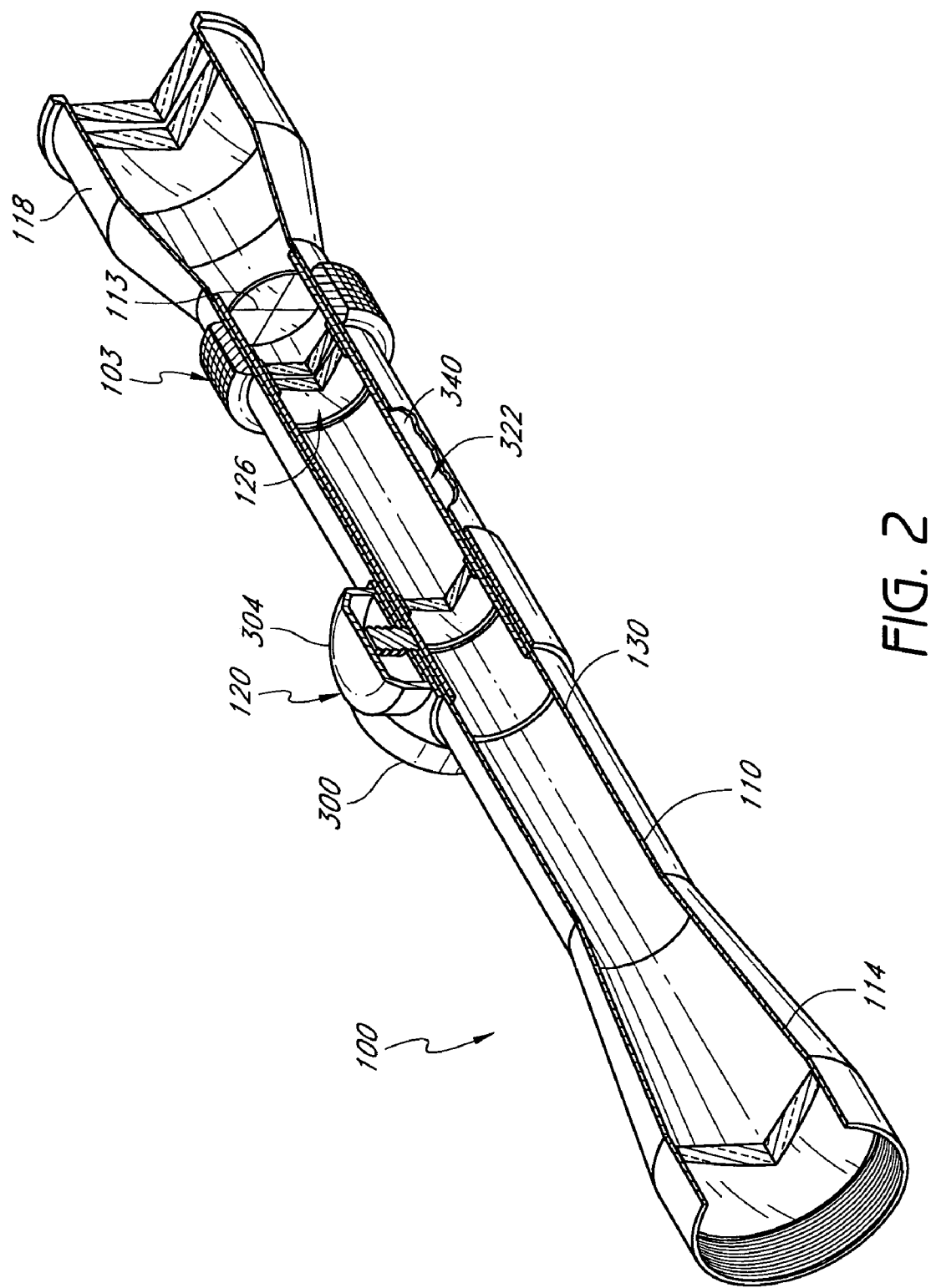
FIG. 2 is a perspective cutaway view of the scope of FIG. 1 illustrating an objective, an erector assembly, and an eyepiece in the scope.

FIG. 2 is a perspective cutaway view of the scope 100 of FIG. 1. As shown, the main body 110 contains an optical train 126 through which light can propagate to provide an image to the observer using the scope 100. In various preferred embodiments, the optical train 126 comprises a plurality of lenses including the objective and eyepiece referred to above and discussed more fully below. In the illustrated embodiment, a portion of the lenses can be selectively longitudinally displaced with respect to each other by using the zoom selector assembly 103 to obtain the desired amount of zoom and/or transversely displaced by using the positioning system 120 to account for windage and elevation. Accordingly, the observer can operate the zoom selector assembly 103 and the positioning system 120 to selectively define the interrelationship between one or more of the lenses of the optical train 126, preferably at any time during the aiming and firing process. A reticle 113 is also included to assist in the aiming process.

In the illustrated embodiment, the main body 110 surrounds and houses the optical train 126 to reduce introduction of contaminants into the scope 100. The main body 110 comprises the enlarged objective end 114, the enlarged eyepiece end 118, and a narrow medial or central tubular body 130 therebetween. In one embodiment, the main body 110 can extend from the widened objective end 114 through the narrow central tubular portion 130 to the widened eyepiece end 118. The eyepiece end 118 and the objective end 114 may be connect to the central tubular body 130 by threading and screwed in place. Preferably, both the objective end 114 and eyepiece end 118 house one or more lenses of the optical train 126, e.g., the objective and the ocular, respectively. Accordingly, the main body 110 preferably houses both the objective and eyepiece. The central tubular portion 130 of the main body 110 can house at least a portion of the optical train 126, such as erecting optics, that can ensure that the image viewed with the scope 100 is properly oriented.

Figure 2A:
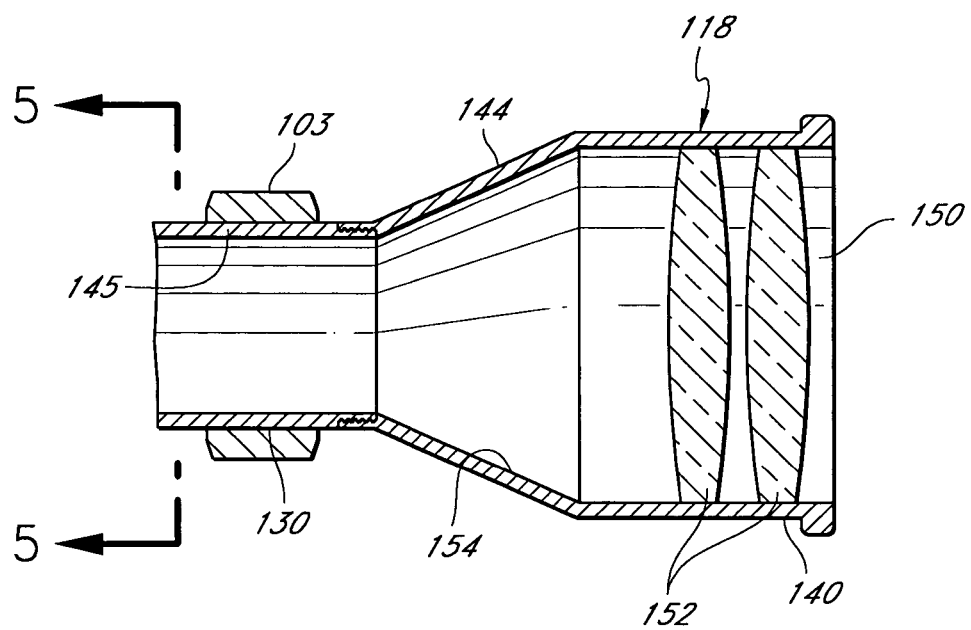
FIG. 2A is an enlarged side cross-sectional view of an eyepiece end of the scope of FIG. 1.

FIG. 2A is a close-up view of the eyepiece end 118 of the main body 110 preferably housing an ocular lens 152 in a proximal end 140 of the eyepiece. As illustrated in FIG. 2A, the proximal end 140 of the eyepiece portion 118 preferably includes an opening or aperture 150 for viewing through the scope 100. In the embodiment depicted, the proximal end 140 is a tubular body that preferably holds the ocular 152, which comprises a pair of lens elements. Other types of ocular lenses 152 that may include more or less lens elements or other optical elements may also be employed. It is also contemplated that the eyepiece end 118 can have any shape or configuration suitable for holding the ocular 152 and provide a viewing window for looking through the scope 100.

Optionally, positioning structures can be disposed on an inner surface 154 of the eyepiece end 114 for securing the ocular 152 in place. The positioning structures can prevent relative movement between the ocular 152 and the eyepiece housing 118. Other methods of securing the ocular 152 within the eyepiece end 118 of the scope are. also possible. Still in other embodiments, one or more lens elements in the ocular is moveable and may be used to focus the image in some cases.

In the illustrated embodiment, the eyepiece end 118 may further comprise a tapered portion 144. The tapered portion 144 extends from the proximal end 140 and tapers in the distal direction. For example, the tapered portion 144 can have a generally circular cross-sectional profile that is reduced in the distal direction towards the objective end 114. The tapered portion 144 of the eyepiece end 118 is preferably coupled to the central tubular portion 130 of the main body 110 as shown in FIGS. 2 and 2A. The narrow central tubular portion 130 has a proximal end 145 connected to the eyepiece end 118. In other embodiments, the eyepiece end 118 and/or the central tubular portion 130 may be shaped and/or contoured differently and may have different relative sizes than shown.

As shown in FIG. 2, the tubular body 130 is also coupled to the objective end 118. The objective end 114 of the scope main body 110 preferably houses an objective 180 as illustrated in the close-up view shown in FIG. 2B.

Figure 2B:
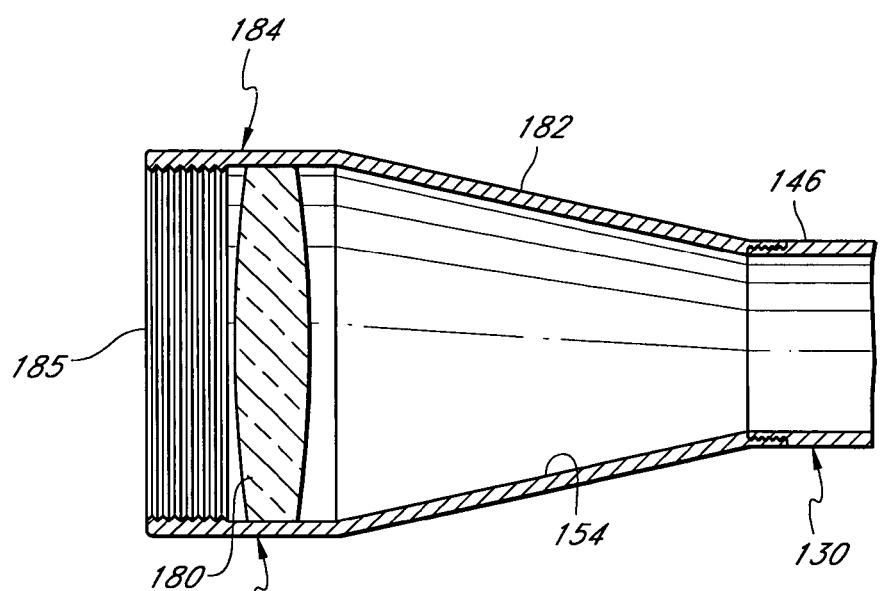
FIG. 2B is an enlarged side cross-sectional view of the objective end of the scope of FIG. 1.

As also shown in FIG. 2B, the objective portion 114 of the main body 110 has a distal end 184 that includes an opening 185 for viewing an object through the scope 100. In the illustrated embodiment, the distal end 184 is a tubular body configured to engage and hold the objective 180 of the optical train 126. However, it is contemplated that the objective end 118 can have any shape, size, or configuration suitable for holding the objective 180 and providing a viewing window for viewing a distant target through the scope 100. For example, the distal end 184 can have a generally constant (non-tapered) cross-sectional profile along its length. However, other configurations are possible.

Optionally, mounting structures can be disposed on the inner surface 154 of the objective end 118 for securely holding the objective 180. The mounting structures can grip and prevent movement of the objective 180 relative to the objective end 118. Other methods of securing the objective 180 within the objective end 114 of the scope 100 are also possible. In other embodiments, however, the objective 180 may include one or more movable optical elements.

In the embodiment illustrated in FIG. 2B, the objective end 114 may further comprise a tapered portion 182. The tapered portion 182 preferably extends from the distal end 184 and tapers in the proximal direction. For example, the tapered portion 182 can have a generally circular cross-sectional profile that is reduced towards the ocular end 118. In other embodiments, the eyepiece end 118 and/or the central tubular portion 130 may be shaped and/or contoured differently and may have different relative sizes than shown. Accordingly, other configurations are possible.

Figure 3:
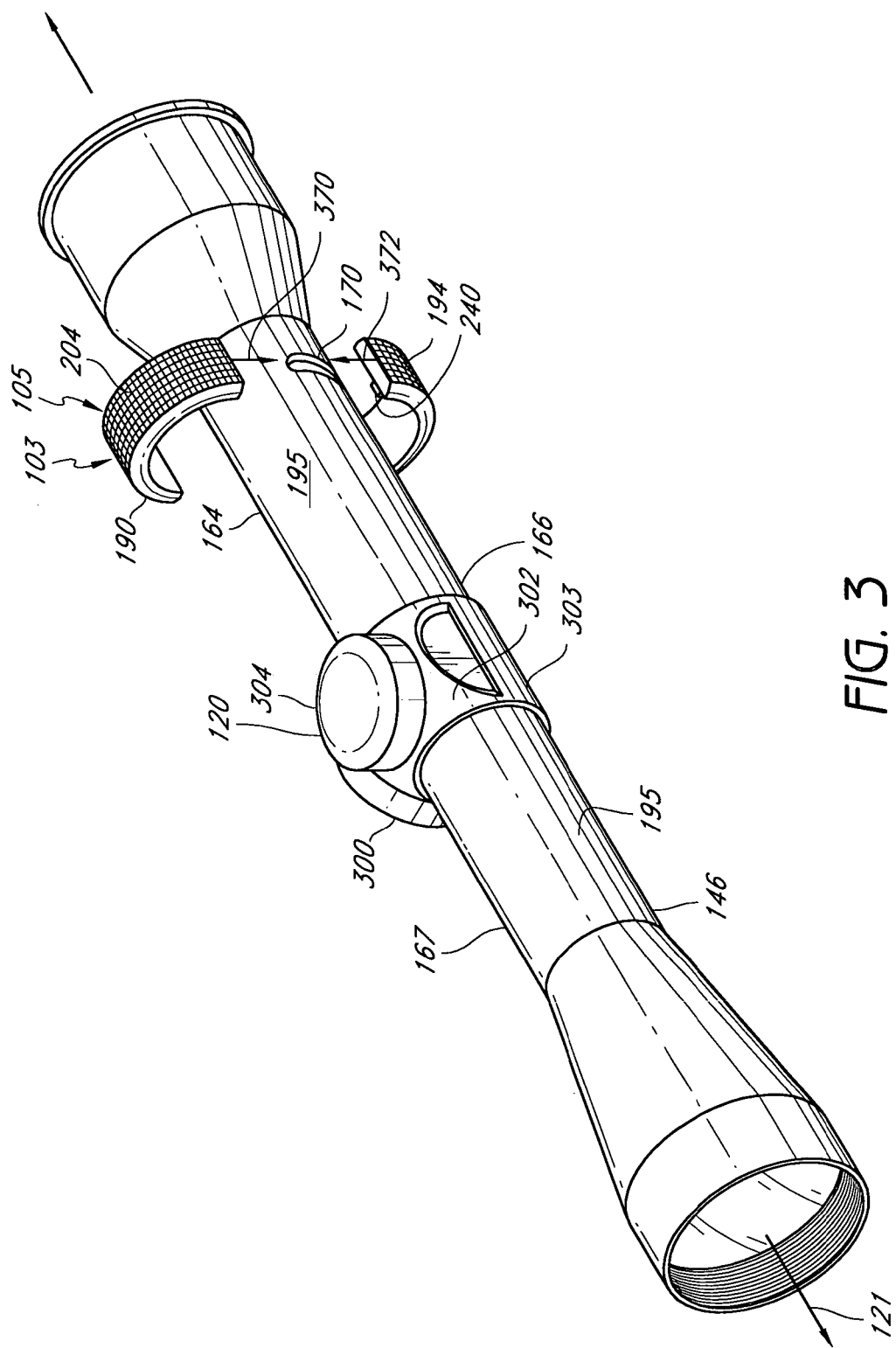
FIG. 3 is a perspective view of the scope of FIG. 1, with an exploded view of a portion of the zoom assembly comprising a zoom selector ring in an opened position.
Figure 4:
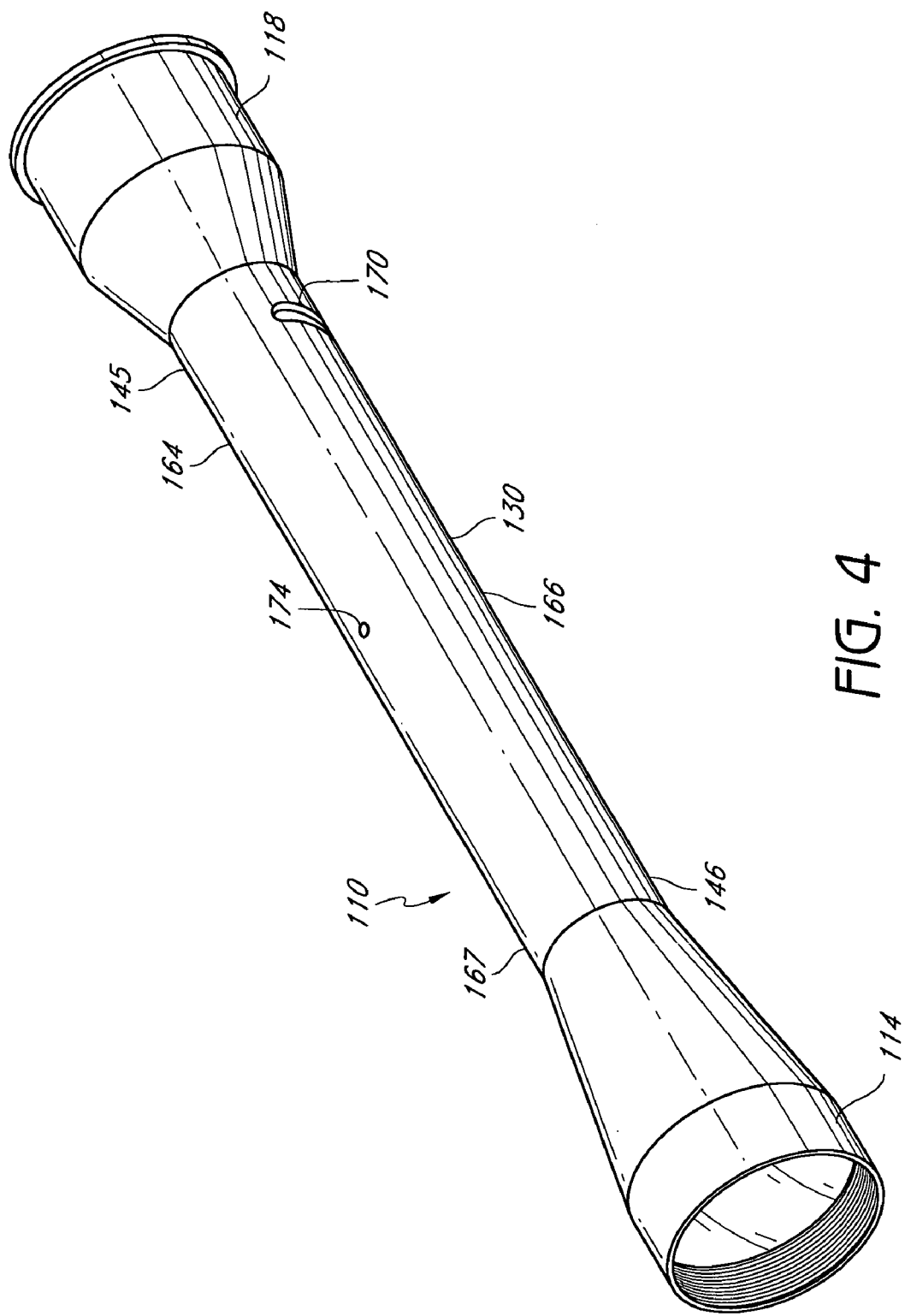
FIG. 4 illustrates a main body of the scope shown in FIG. 1 with the zoom selector ring removed.

As shown in FIGS. 3 and 4, the tubular body 130 extends from a proximal portion 164, through a middle body portion 166, and to a distal portion 167. As illustrated, the tubular body 130 of the scope 100 has a generally tubular shape that is sized and configured to house erecting optics. In various embodiments, a substantial portion of the central tubular body portion 130 has a cross-sectional area that is less than the cross-sectional area of the eyepiece end 114 although such a configuration is not required. In some embodiments, a substantial portion of the tubular body 130 has a cross-sectional area that is less than the cross-sectional area of the objective end 118. In the illustrated embodiment, the entire tubular body 130 has a cross-sectional area that is less than the cross-sectional area of the eyepiece end 114 and the cross-sectional area of the objective end 118. In other embodiments, however, the size, shape, and contouring of the main body 110 may be different. The tubular body 130 may be the same size or larger than one of the objective end 114 or eyepiece end 118 or both. The tubular body 130 can also have a cross-sectional area that varies along its length. For example, the tubular body 130 may have a widened portion to support the zoom selector ring 105 sized to be comfortably handled by the user. However, the tubular body 130 can have any shape suitable for housing one or more components of the optical train 126 and possibly for supporting the positioning system 120 and/or the zoom selector ring 105.

As shown in FIG. 3, the proximal portion 164 of the tubular body 130 is disposed through and surrounded at least in part by the zoom selector ring 105. Additionally, the proximal portion 164 of the tubular body 130 can have an elongated opening or slot 170 (see, e.g., FIG. 4).

The slot 170 in the tubular body 130 defines a window between the interior and the exterior of the main body 110 so that an extension from the zoom selector ring 105 can pass through and into the interior of the main body 110 and engage a support structure supporting optics in the optics train 126 as discussed more fully below. In the illustrated embodiment, the slot 170 has a generally constant width and continues along a portion of the circumference of the main body 110. The slot 170 can have other shapes and sizes and need not be restricted to the slot shown. The slot 170 can also be positioned elsewhere. For example, the slot 170 can alternatively be disposed in the middle body 166 or the distal portion 167. Likewise the zoom selector ring 105 can be located elsewhere, including on the eyepiece end 118.

As shown in FIG. 4, an opening or hole 174 can optionally pass through the main body 110, e.g., in the middle portion 166 of the tubular body 130 to receive an actuator that forms part of the positioning system 120. Preferably, for example, movement of the windage and elevation dials 304, 300 may be coupled through the hole 174 to adjust optics in the optics train 126 to effectuate the appropriate corrections for proper aiming. Preferably, however, the slot 170 and the opening 174 do not permit moisture or contaminants from reaching the optics in the scope 100.

The main body 110 preferably comprises a material that is suitable for housing optics and preferably has suitable corrosion resistant characteristics. For example, the main body 110 may comprise metal, plastic, composites, and/or the like. In various embodiments, the main body 110 comprises magnesium. In certain exemplary embodiments, the main body 110 comprises aluminum-magnesium-titanium alloy. The materials, however, should not be limited to those specifically recited herein as a variety of materials can be used alone or in combination to form the main body 110. The appropriate dimensions and the type of materials that form the main body 110 may be determined based on, e.g., the arrangement of the optical train 126 and the desired weight and structural properties of the main body 110.

As described above, the zoom selector ring 105 may be used as a control for controlling the optical train 126. In particular, the user can rotate the zoom selector ring 105 in certain preferred embodiments to adjust the size of the images viewed through the scope 100.

The zoom selector ring 105 may be multi-piece body configured to slidably engage the main body 110. In one embodiment, the zoom selector ring 105 is a segmented body that extends substantially around the main body 110. FIG. 3 shows an embodiment of the zoom selector ring 105 comprising a plurality of segments that mate with the outer surface 195 of the main body 110. The zoom selector ring 10S is depicted in an opened position in FIG. 3 with the segments spaced apart. In other embodiments, the zoom selector ring 105 may have a single body configuration.

In the embodiment illustrated in FIG. 3, the selector ring 105 is located between the center of the main body 110 and the proximal end 145. In another embodiment, the selector ring 105 is spaced less than about ⅓ of the length of the tubular body 130 from the eyepiece end 114. Although the zoom selector ring 105 is preferably located along the proximal portion 164 of the tubular body, optionally, the selector ring 105 can be located along the middle body 166 or the distal portion 167 of the central body 130. In certain embodiments, the main body 110 can have an annular ridge or body that mates with an inner annular body or groove of the selector ring 105 to prevent longitudinal movement between the selector ring 105 and the main body 110.

In the illustrated embodiment of FIG. 3, the zoom selector ring 105 comprises a pair of curved segments 190 and 194 that can be closed, e.g., by joining the separate segments together.

When the selector ring 105 is in the closed position, each of the segments 190, 194 is preferably arranged about the circumference of the tubular body 130. In one embodiment, the zoom selection ring 105 extends at least substantially about the circumference of the main body 110. FIG. 1 depicts the segments disposed circumferentially about the outer surface 195 of the tubular body 130.

Figure 5:
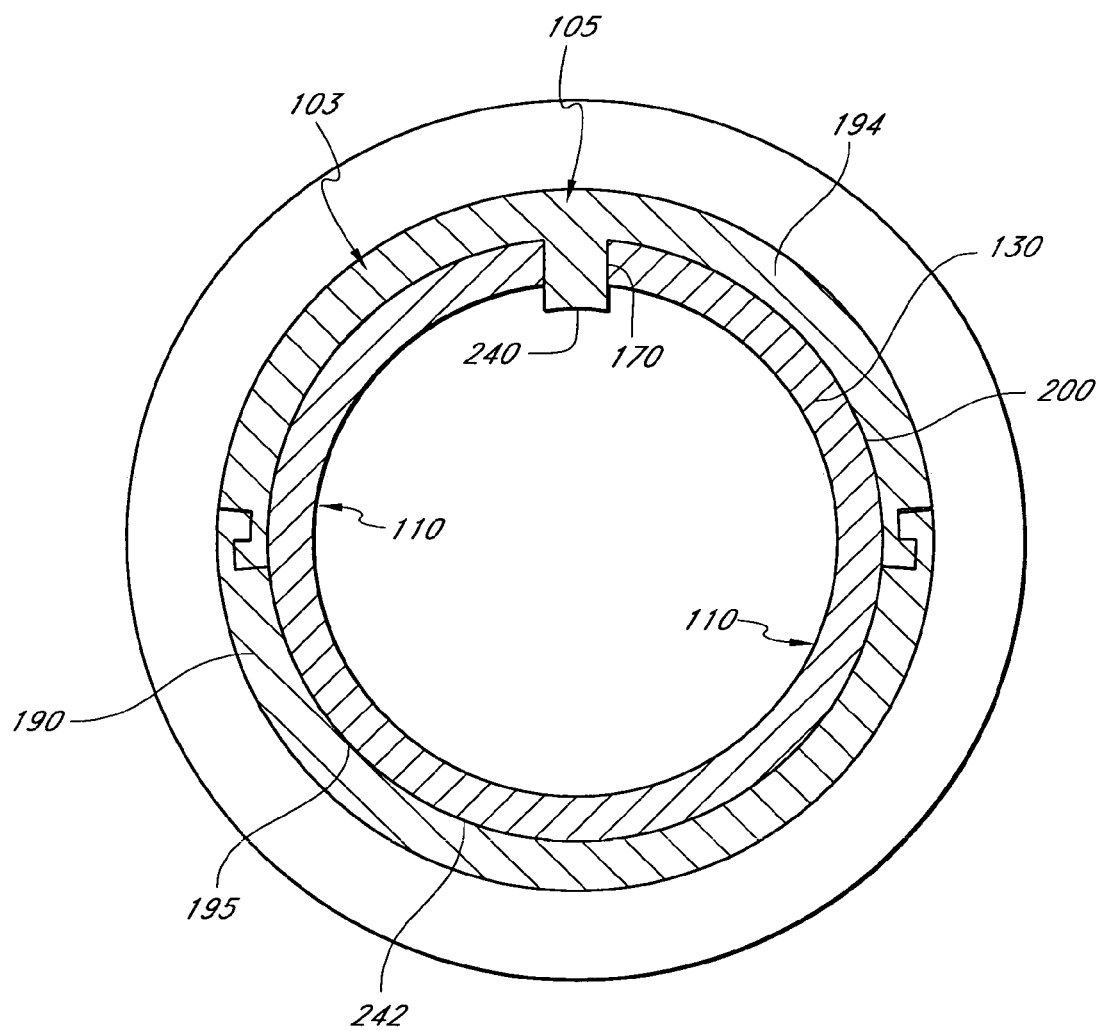
FIG. 5 is a cross-sectional view of the scope along line 5-5 in FIG. 2A.
Figure 6:
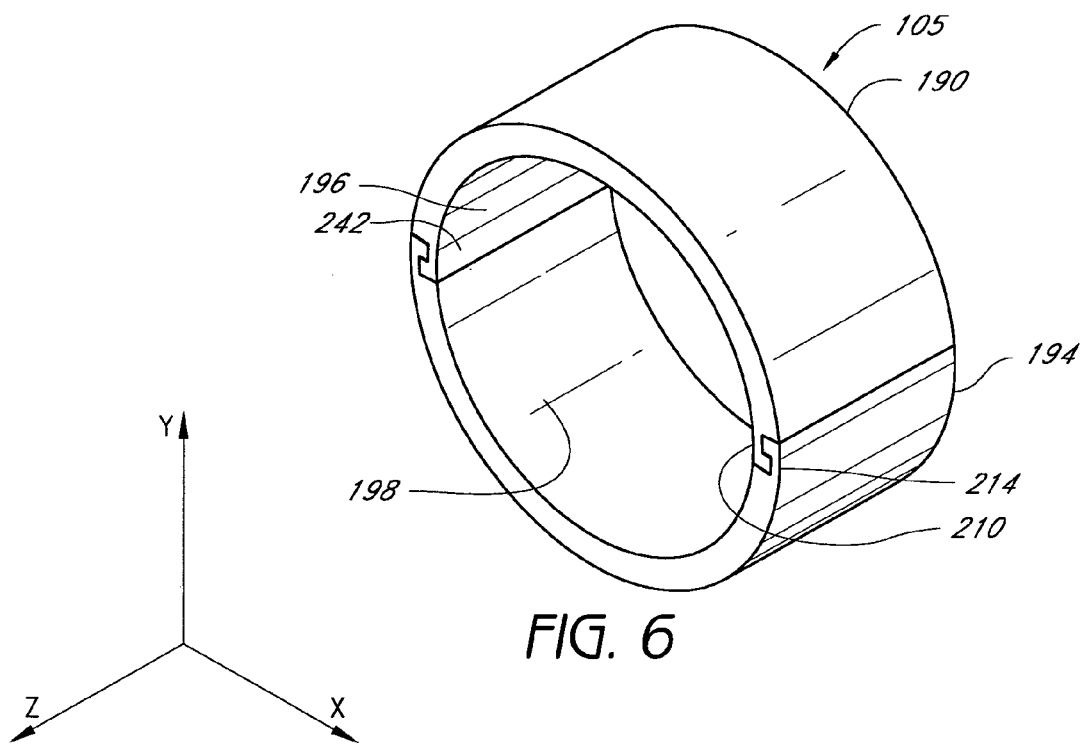
FIG. 6 is a perspective view of one embodiment of a zoom selector ring in a closed position.

As illustrated in FIGS. 5 and 6, the curved segments 190, 194 can have inner surfaces 196, 198 that preferably form a surface 242 which mates with the outer surface 195 of the main body 110. The surface 242 can have a generally tubular shape and can be concentric with the outer surface 195 of the main body 110 when the zoom selector ring 105 is in the closed position.

As shown in the cross-sectional view depicted in FIG. 5, each of the segments 190, 194 extends about a portion of the main body 110. The segments 190, 194 can be similarly or differently sized of the main body 110. For example, the segments 190, 194 can each extend about 180° around the tubular body 130 of the main body 110. Preferably, the segments 190, 194 are disposed about the main body 110 such that the two segments completely circumscribe the main body 110. In one embodiment, the zoom selector ring 105 can preferably comprise more than two segments. For example, the zoom selector ring 105 can comprise three segments that are fastened together. The three segments can each extend about 120° around the tubular body 130 and can be fastened or coupled together to form a zoom selector ring 105. The segments can be fastened together in a similar manner as the segments 190, 194, as discussed below. It is contemplated that any suitable number of segments can be used to form the zoom selector ring 105. The segments 190, 194 may be securely coupled together to limit, preferably prevent, relative movement between the segments 190, 194, thereby forming a generally annular zoom selector ring that preferably maintains it shape during operation.

Figure 7A:
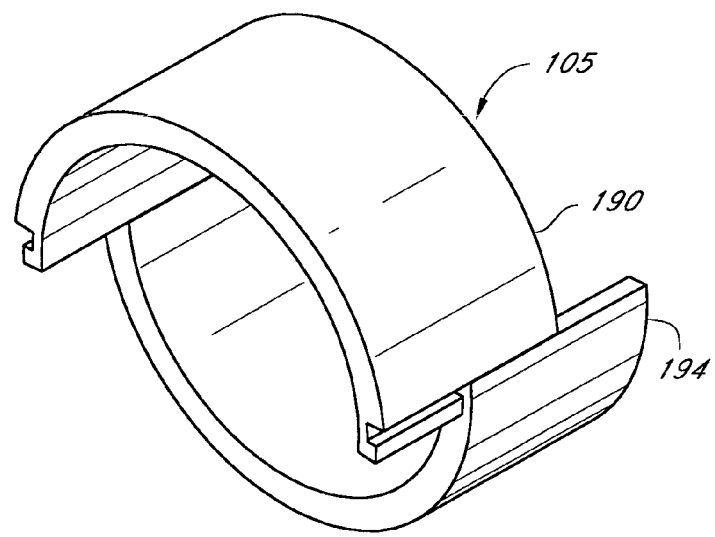
FIG. 7A is a perspective view of the zoom selector ring of FIG. 6 schematically illustrating interconnection of sections of the zoom selector ring.
Figure 7B:
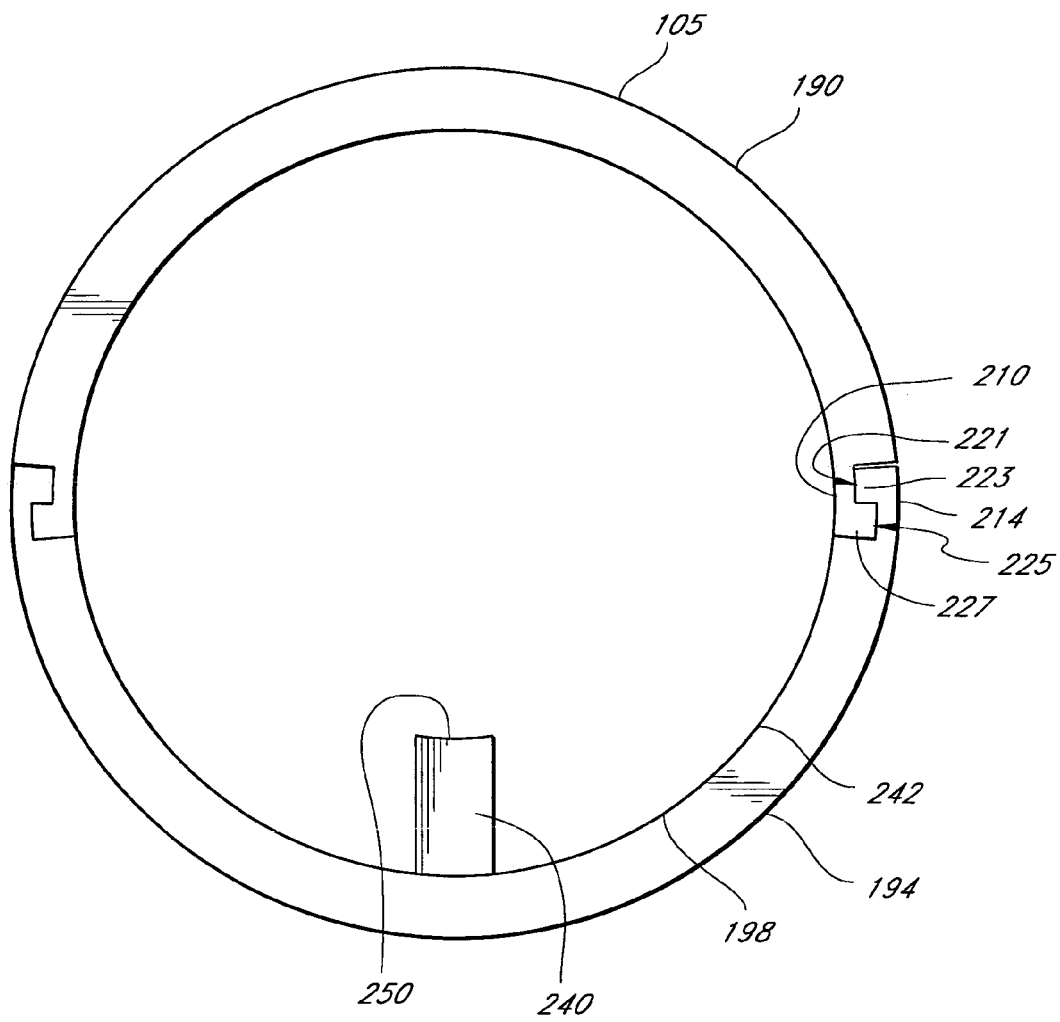
FIG. 7B is front view of the zoom selector ring of FIG. 7A.

FIGS. 6, 7A, and 7B show the selector ring 105 comprising coupling structures 210, 214 for coupling together the curved segments 190, 194. The segments 190, 194 can be slid together linking the segments together. As shown in FIG. 7B, the segments may be outfitted with ridges 223 and 227 that interlock. As illustrated, for example, the coupling structure 210 has a slot 221 configured to receive a portion of the segment 194. In one embodiment, the slot 221 faces outwardly and is configured to receive at least a portion of the ridge 223 of the coupling structure 214. The coupling structure 214 has a slot 225 configured to receive a portion of the segment 190. In the illustrated embodiment, the slot 225 faces inwardly and is configured to receive at least a portion of the ridge 227 of the coupling structure 210. Preferably, the slots 221, 225 are toleranced to reduce or prevent substantial movement of the segments 190, 194 away from each other. Optionally, the slots 221, 255 can have ratchets, teeth, and/or other structures to prevent relative longitudinal movement between the segments 190, 194. For example, although not illustrated, a pin can be disposed through the segments 190, 194 to prevent relative longitudinal movement between the segments 190, 194. In one embodiment, a pin is disposed through the coupling structures 210, 214 and locks the segments 190, 194 together. The segments 190, 194 can be interlocked or connected in other ways.

As shown in FIG. 7B, the zoom selector ring 105 can have a structure configured to control the optical train 126. In the illustrated embodiment, the selector ring 105 has a protuberance or member 240 that can pass through the slot 170 and couple the zoom selector ring to the optical train 126, e.g., via a structure supporting the optics. The protuberance 240 can extend inwardly from the inner surface 242 of the zoom selector ring 105. The protuberance 240, however, can be located at any suitable point along the selector ring 18. The protuberance 240 is preferably sized and configured to pass through the slot 170 such that the protuberance 240 can be slid along the slot 170 as the zoom selector ring 105 is rotated about the longitudinal axis 121 of the scope 100. The protuberance 240 and the slot 170 can therefore cooperate to define the amount of travel of the zoom selector ring 105. The protuberance 240 extends from the surface 198 of the segment 194 and passes through the slot 170 (see FIG. 5) in the central narrow portion 130 of the main body 110 and continues through the wall of the tubular body 130. In some embodiments, the protuberance 240 may be configured to engage a structure supporting a portion of the optical train 126 to drive movable portions of the optical train in the longitudinal direction, as described below.

A seal 200 (see FIG. 5) may optionally be formed between the zoom selector ring 105 and the tubular body 130. In one embodiment, at least a portion of inner surfaces 196, 198 of the segments 190, 194, respectively, can interact with the outer surface 195 of the tubular body 130 to form the seal 200. The integrity of the seal 200 is preferably maintained as the zoom selector ring 105 slidably engages the tubular body 130 so that foreign matter is prevented from entering the scope 100 by, e.g., passing through the slot 170. Thus, the zoom selector ring 105 can be rotated about the main body 110 while the optics remains contaminate free. In one embodiment, a substantial portion of the surface 242 of the zoom selector ring 105 engages the outer surface 195 of the scope 100 to form the seal 200. Optionally, a slip ring or other body can be disposed between the tubular body 130 and the selector ring 105 to reduce friction.

In the illustrated embodiment, the zoom selector ring 105 has a generally uniform cross-sectional profile along its longitudinal axis. However, the zoom selector ring 105 can have a cross-sectional profile that varies along its longitudinal axis. The zoom selector ring 105, for example, may be ergonomically designed and have a dimple that comfortably fits the fingers of the user. The zoom selector ring 105 can be shaped and contoured in other ways, for example, for interaction with the use or connection with the main body 110 of the scope 100, of for other reasons including aesthetic design.

Additionally, the zoom selector ring 105 can optionally have an outer surface 204 (FIG. 3) configured to be engaged by a user to easily rotate the ring 105 about the longitudinal axis 121 of the scope 100. The zoom selector ring 105 can comprise an outer surface 204 adapted to provide friction between the user's fingers and the zoom selector ring 105. For example, the outer surface 204 may comprises knurling substantially about the entire outer surface 140 of the zoom selector ring 105. Serrations, roughened surfaces, and other finishing may be provided. The outer surface 204 can have any suitable texture or structures for providing a gripping surface. Alternatively, the zoom selector ring 105 can have other designs yielding the desired interaction between the user and the ring 105. Optionally, for example, the outer surface 140 can be generally smooth. In some embodiments the zoom selector ring 105 includes an elastic band that extends about the zoom selector ring 105. This elastic band may assist in tactile control by the user.

The zoom selector ring 105 may comprise a variety of materials. Examples include but are not limited to metal and plastic.

Rotational movement of the zoom selector ring 105 causes movement of the one or more lenses in the optical train 126 to provide the desired zoom. In particular, rotation of the zoom selector ring 105 may cause the optics in the optics train 126 to be longitudinally displaced with respect to each other. A mechanism for shifting the optical elements in the optics train 126 is discussed more fully below. Additionally, the positioning system 120 can be employed to laterally displace one or more optical elements in the optics train 126 and adjust the windage and/or elevation. Such approach is also discussed below.

Figure 8:
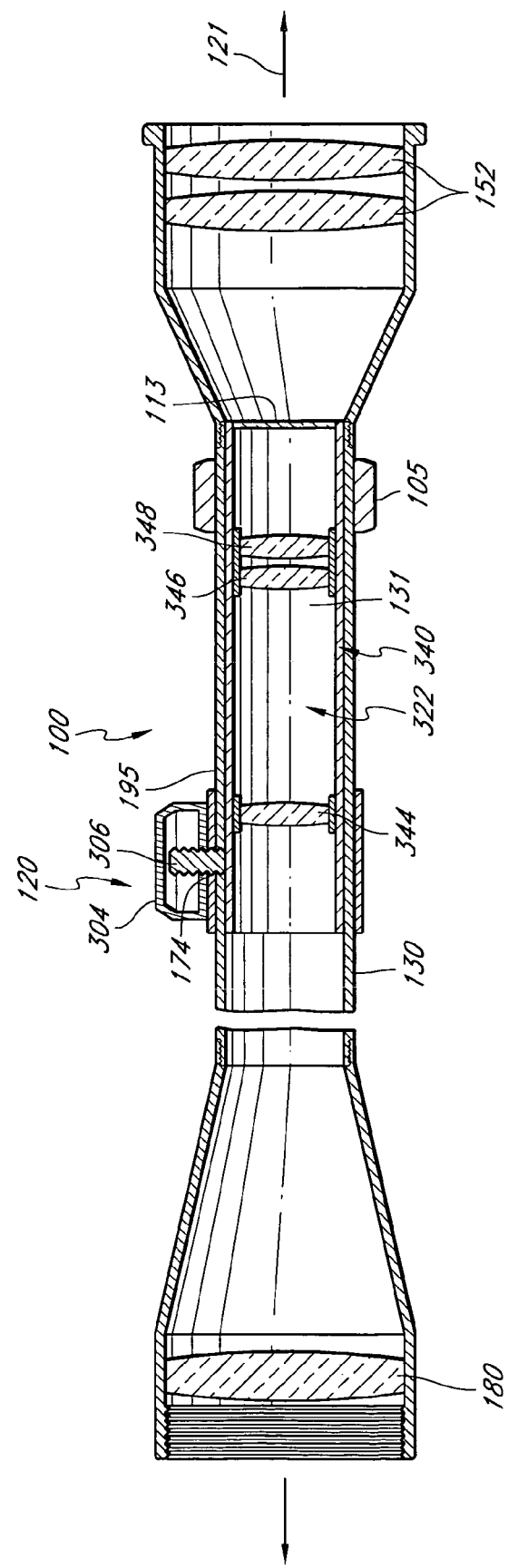
FIG. 8 is a side cross-sectional view of the scope of FIG. 1 showing the erector assembly disposed between the objective end of the scope and the eyepiece end.

As shown in FIG. 8, the tubular body 130 preferably defines a hollow channel 131 that is configured to receive a portion of the optical train 126. As described above, the optical train 126 preferably comprises a plurality of lenses including, e.g., the objective lens 180 and the ocular 152, that are arranged to provide an image of the target. In the various embodiments, the optical train 126 further comprises an erector assembly 322 disposed between the ocular 152 and the objective 180. The erector assembly 322 may include a plurality of lenses that inverts the image to ensure that the viewer observes erect, properly oriented, images through the scope 100. The erector assembly 322 comprises an erector housing 340 that contains a plurality of erector lens elements 344, 346, 348 that are spaced along the erector housing.

As illustrated in FIG. 8, the positioning system 120 can be used to tilt and shift a portion of the optical train 126 such as the erector assembly 322. The positioning system 120 comprises the windage dial 300 (not shown) and screw (not shown) and the elevational dial 304 and screw 306. The screw for the windage dial 300 and the screw 306 for the elevational dial 304 can pass through the outer surface 195 of the tubular body 130 through the opening 174. The screw 306 can be advanced in and out of the tubular body 130 by rotating the elevational dial 304. For example, the elevational dial 304 can be rotated to cause vertical movement of the screw 306 which, in turn, causes vertical movement of the distal end of a erector assembly 322 or the zoom mechanism. The windage dial 300 can be rotated in a similar manner to laterally displace the distal end of the erector assembly 322. Thus, the windage dial 300 and the elevational dial 304 can be used to shift and/or tilt the erector assembly 322 to the desired position and orientation. Skilled persons will recognize that movement of the distal end of the erector assembly 322 causes the apparent position of the reticle to move. A straight line, defined by the longitudinal orientation of main tube 110 defines a main tube-straight line point, where the straight line intersects with the imagery seen through the scope. This point is not marked, unless it happens to coincide with the reticle placement. The apparent position of the reticle is the imagery point over which a viewer sees the reticle crosshairs superimposed, relative to the main tube straight line point. Even at factory settings, when the elevation and windage knobs are set to zero, there is typically some difference between the straight line point and the apparent reticle position, to compensate for anticipated bullet drop at a given range. Skilled persons will also appreciate that the windage dial 300 and the elevation dial 304, together with the mechanisms driven by these two dials, both of which move the distal end of the erector assembly 322 are, in effect, a reticle apparent position adjustment assembly. Skilled persons will also appreciate that such an adjustment assembly could take many different forms.

Additionally, the optics in the erector assembly 322 may be altered by manually operating the zoom selector ring 105 thereby causing the image to appear closer or farther. Preferably, at least a portion of the erector assembly 322 is axially movable relative to another portion of the optical train 126 to provide telescopic zoom capability of the scope 100. For example, the erector assembly housing 340 can be configured to engage at least a portion of the zoom selector ring 105 so that manual or automatic rotation of the zoom sector ring about a longitudinal axis 121 through the scope 100 causes movement or one of more erector lens elements 344, 346, 348 in the longitudinal direction.

Figure 9:
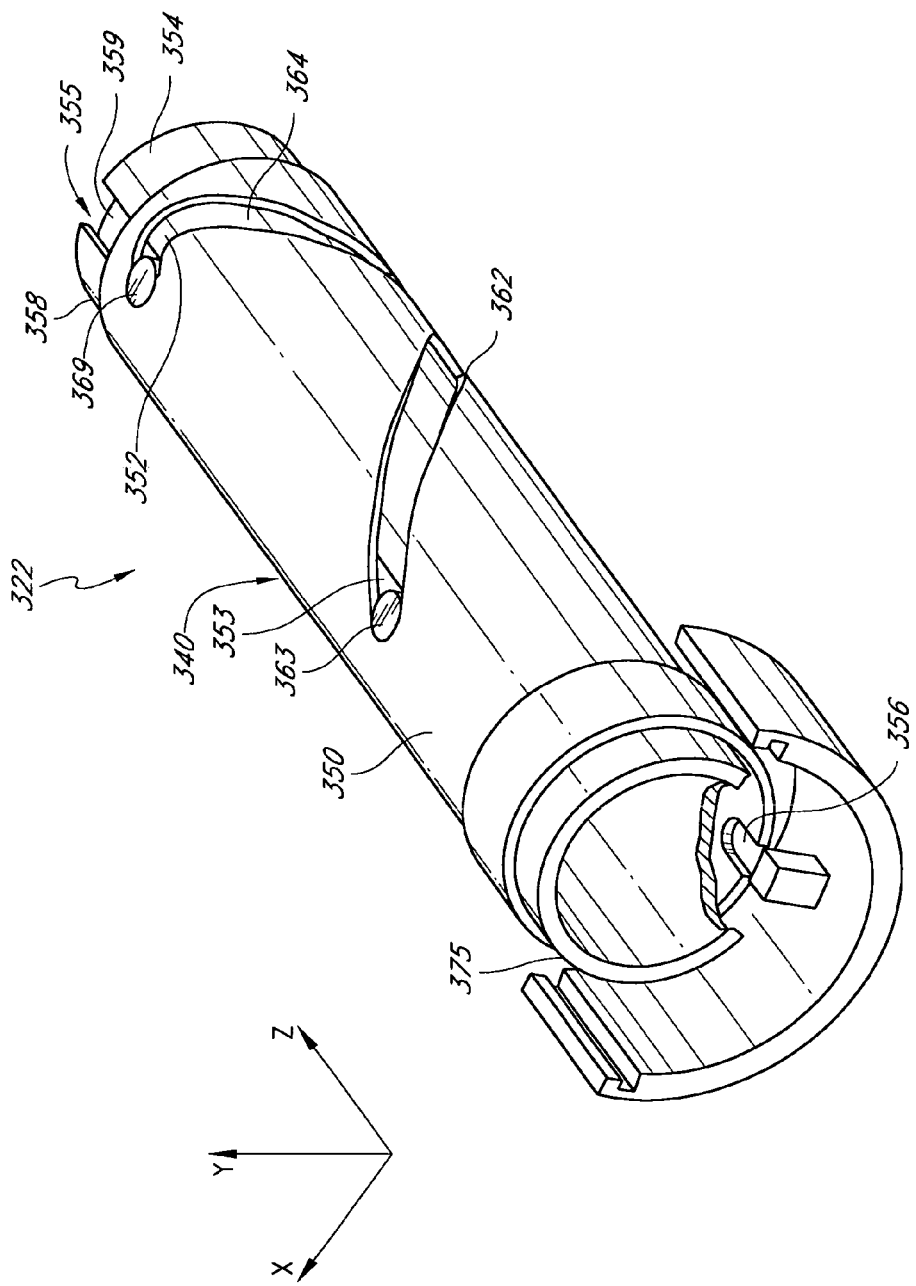
FIG. 9 is a perspective view of an erector assembly and a portion of a zoom selector ring linked to the erector assembly, wherein the erector assembly comprises a housing comprising an outer tube, an inner tube, and carriages in the inner tube.
Figure 10:
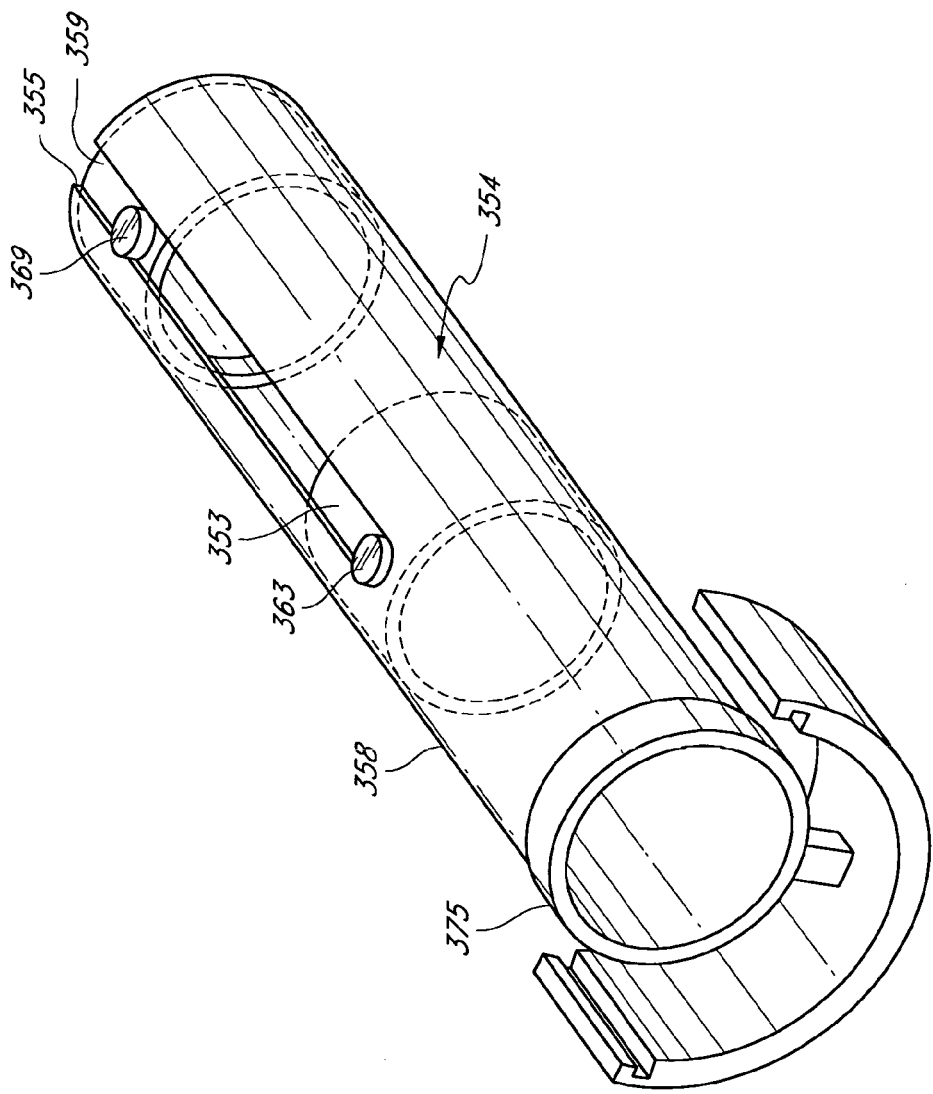
FIG. 10 is a perspective view of the carriages inside the inner tube of a housing of the erector assembly.
Figure 11:
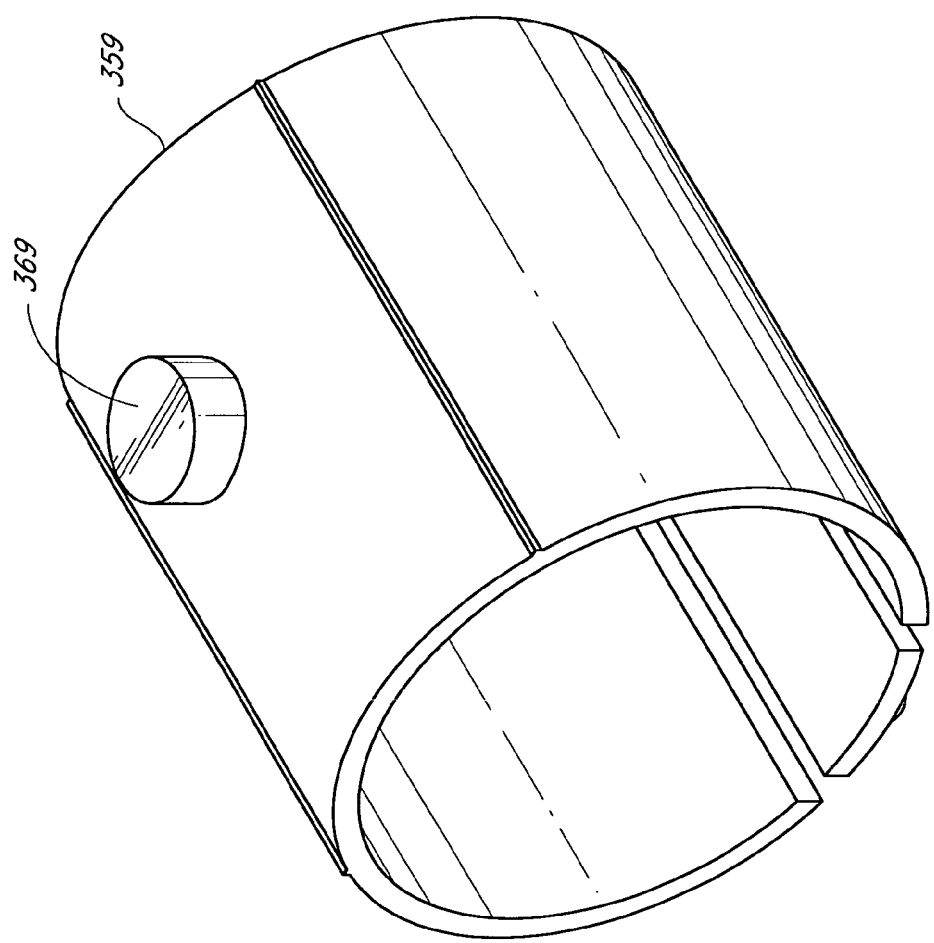
FIG. 11 is a perspective view of a carriage of the erector assembly of FIGS. 9 and 10.

FIG. 9 shows the housing 340 of the erector assembly 322 comprising an outer tubular body 350 having a cam 352 and an inner tube 354 having a slot 355. The inner tube 354 fits within the outer tubular body 350. As shown in FIGS. 9 and 10, the erector assembly 322 can include moveable carriages 353, 359 that can fit inside the inner tube 354 but engage the outer tubular body 350. These carriages 353, 359, one of which is schematically illustrated in FIG. 11, hold optics of the optical train 126. For example, the proximal carriage 353 supports and carries the rearward lens elements 346, 348 and the distal carriage 359 supports and carries the forward lens element 344. The carriages 353, 359 can be moved with respect to the inner tube 354, outer tube 350, and main tube 110 by rotating the selector ring 105; see FIG. 9.

Figure 12:
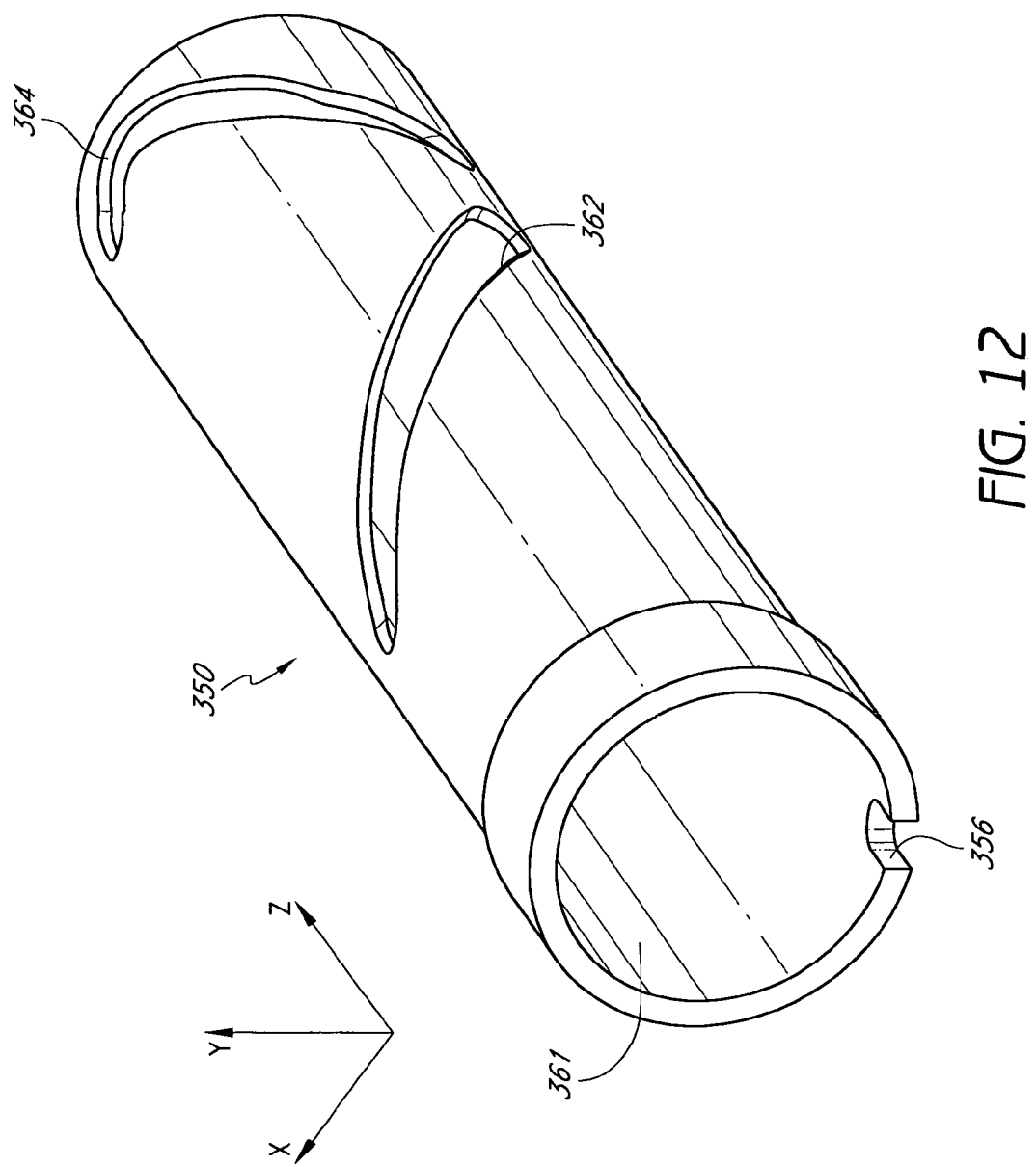
FIG. 12 is a perspective view of the outer tube of the housing of the erector assembly of FIG. 8.

As shown in FIGS. 9 and 12, a cam 352 and a notch 356 can be defined in the outer tube 350. The cam 352 may be a spiral-like opening defined by the outer tube 350 and is configured to receive and slidably engage the protrusions of the carriage (see FIG. 9). Other shapes are also possible. Optionally, a plurality of cams 352 may used. In the illustrated embodiment, the outer tube 350 includes first and second cams 362, 364. Each of the cams 362, 364 can be configured to slidably engage a protrusions 363, 369 on the rearward and forward carriages 353, 359, respectively. It is contemplated that the length and curvature of the cams 362, 364 can be varied to achieve the desired amount of longitudinal travel of the carriages 353, 359 for a certain amount of rotation of the zoom selector ring 105. For example, the scope 100 can provide 3× magnification when the carriages 353, 359 travel the entire length of their respectively cams 362, 364. Moreover, cams 362, 364 may cause the first carriage 353 to move with respect to the second carriage 359 (or vice versus) and with respect to the objective and eyepiece. Alternatively, the first and second carriage 353, 359 can move a same amount with respect to the objective and eyepiece. Other configurations are possible. For example only some of the lens elements 344, 346, 348 may be moved in certain embodiments.

With continued reference to FIG. 9 and FIG. 12, the notch 356 is preferably configured to receive a portion of the member 240 of the selection ring 105. In one embodiment, the notch 356 is a U-shaped notch sized to receive the member 240 shown in FIGS. 5 and 6B. As the selector ring 105 is rotated, the member 240 is disposed within the notch 356 to cause rotation of outer tube 350 about the longitudinal axis 121 of the scope 100. As the outer tubular body 350 rotates about the longitudinal axis 121 relative to the inner tube 354, the carriages 353, 359 can move relative to each other, to the objective or to the eyepiece or any combination thereof as the protrusions 363, 369 on the respective carriages proceed along cams 362, 364.

As shown in FIG. 12 the outer tube 350 has an inner surface 361. Similarly, the inner tube 354 has an outer surface 358 as shown in FIG. 10. Preferably, the inner surface 361 of the outer tubular body 350 moves with respect to the outer surface 358 of the inner tube 354 as the outer tube 350 is rotated and the carriage 353, 359 are displaced. In various preferred embodiments, the inner tube 354 is fixed, for example, to the main tube 110 to prevent rotation of the inner tube when the zoom selector ring 105 and outer tube 354 are rotated. Preferably, the outer surface 358 of the inner tube 354 is in substantial contact with the inner surface 361 of the outer tube 350 so as to provide sealing therebetween. Such a seal may counter formation of contaminants between the inner tube 354 and the outer tube 350 and on the optics therein.

In various preferred embodiments, the inner tube 354 provides a guide for the carriages 353, 359 as the outer tube 350 is rotated. FIGS. 9 and 10 illustrate the connection between the inner tube 354 and the carriages 353, 359. In the illustrated embodiment, the inner tube 354 has an elongated slot 355 configured to receive protrusions 363, 369 of the carriages 353, 359. The slot 355 extends proximally from the distal end of the inner tube 354. As described above, the inner tube 354 can be coupled to the main body 110 (e.g., through lip 375) to prevent or inhibit relative rotation between of the inner tube 354 and the main body 110. Connection between the inner tube 354 and the main body 110 therefore, in various preferred embodiments, ensures that the inner tube 354 does not rotate relative to the main body 110 such that the carriages 353, 359 can be guided in a longitudinal direction with the rotation applied by the outer tube 350. Accordingly, the erector optics will be axially translated to provide zoom capability.

In operation, the scope 100 can be mounted to a firearm. The firearm can have a mounting structure for receiving and holding the scope 100. A user can hold and position the firearm so that the scope 100 is located in a desired position. The optical train 126 of the scope 100 may include a reticle (e.g., cross-hair reticle 113 shown in FIG. 2) that indicate the expected impact location of a projectile (e.g., a bullet, arrow, pellet, BB, paintball, or the like) fired from the firearm.

The user can operate the positioning system 120 to accommodate for windage and/or elevation. For example, if there is a cross wind, the windage may cause the projectile fired from to firearm to miss the desired target that is viewed through the scope 100. To ensure that the projectile impacts the desired target, the user can rotate the windage dial 300 which, in turn, rotates its corresponding screw that laterally shifts the optical train 126 to accommodate for the windage. In the illustrated embodiment, the windage dial 300 is used to position the distal end of the erector assembly 322. Once the erector assembly 322 is located in the proper position, the user can position the cross-hair reticle 113 of the scope 100 on the target and ignore the windage, which is already taken into account. To accommodate for elevation, the user can rotate the elevational dial 304, which causes rotation and vertical movement of the screw 306 (shown in FIGS. 2 and 8). The screw 306 can be moved until the erector assembly 322 is tilted to the proper location. Once the erector assembly 322 is in the desired position, the user can position the cross hairs of the scope 100 on the target and disregard the elevation.

The user can operate the zoom selector ring 105 to obtain the desired zoom. In the illustrated embodiment, the user can rotate the zoom selector ring 105 to position one or more of the optical elements (e.g., one or more of the erector lenses 344, 346, 348) of the optical train 126 to adjust the amount of magnification of the scope 100. To move the zoom selector ring 105, the user can grip and twist the zoom selector ring 105 about the longitudinal axis 121 of the scope 100. To provide discrete amounts of longitudinal magnification, the zoom selector ring 105 may have a plurality of predetermined locations that correspond to a certain zoom/magnification settings. The zoom selector ring 105 may be biased to several angular positions. However, in some embodiments the zoom selector ring 105 may provide a continuous range of levels of zoom. It is contemplated that the zoom selector ring 105 can be operated before, during, and/or after operation of the positioning system 120.

In one embodiment, when the zoom selector ring 105 is rotated in the counter-clockwise direction about the longitudinal axis 121 from the perspective of the user, the outer tube 350 likewise rotates in the counter-clockwise direction and the carriages 353, 359 moves towards each other. When the zoom selector ring 105 is moved in the clockwise direction about the longitudinal axis 121 from the perspective of the user, the outer tube 350 likewise rotates in the clockwise direction and moves the carriages 353, 359 away from each other. The user can therefore rotate the zoom selector ring 105 to move the erector assembly 322 to obtain a desired amount of magnification. Other designs are possible.

As depicted in FIG. 9 and discussed above, the zoom selection ring 105 is preferably connected to the erector assembly 322 so as to engage the optical train 126. In the illustrated embodiment, the zoom selector ring 105 is oriented so that the protuberance 240 mates with the notch 256. Likewise, movement of the protuberance 240 and the outer tube 350 causes rotation of the outer tube 350 of the erector assembly 322 and displacement of components of the optical train 126 along the main body 110. In various embodiments, the carriages 353, 359 move the lenses of the erector in response to rotational movement of the zoom selector ring 105.

Regardless of the type of connection between the zoom selector ring 105 and the optics train 126, the main body 110 preferably curtails the amount of foreign matter such as moisture, dust, dirt, and other contaminants that reaches the optics. Dirt and contamination on the optics may reduce the resolution and clarity of the images. Foreign matter may also cause malfunction of the moving parts in the scope. Contamination may hasten deterioration and may also interfere with the precise alignment of the aiming device.

Figure 13:
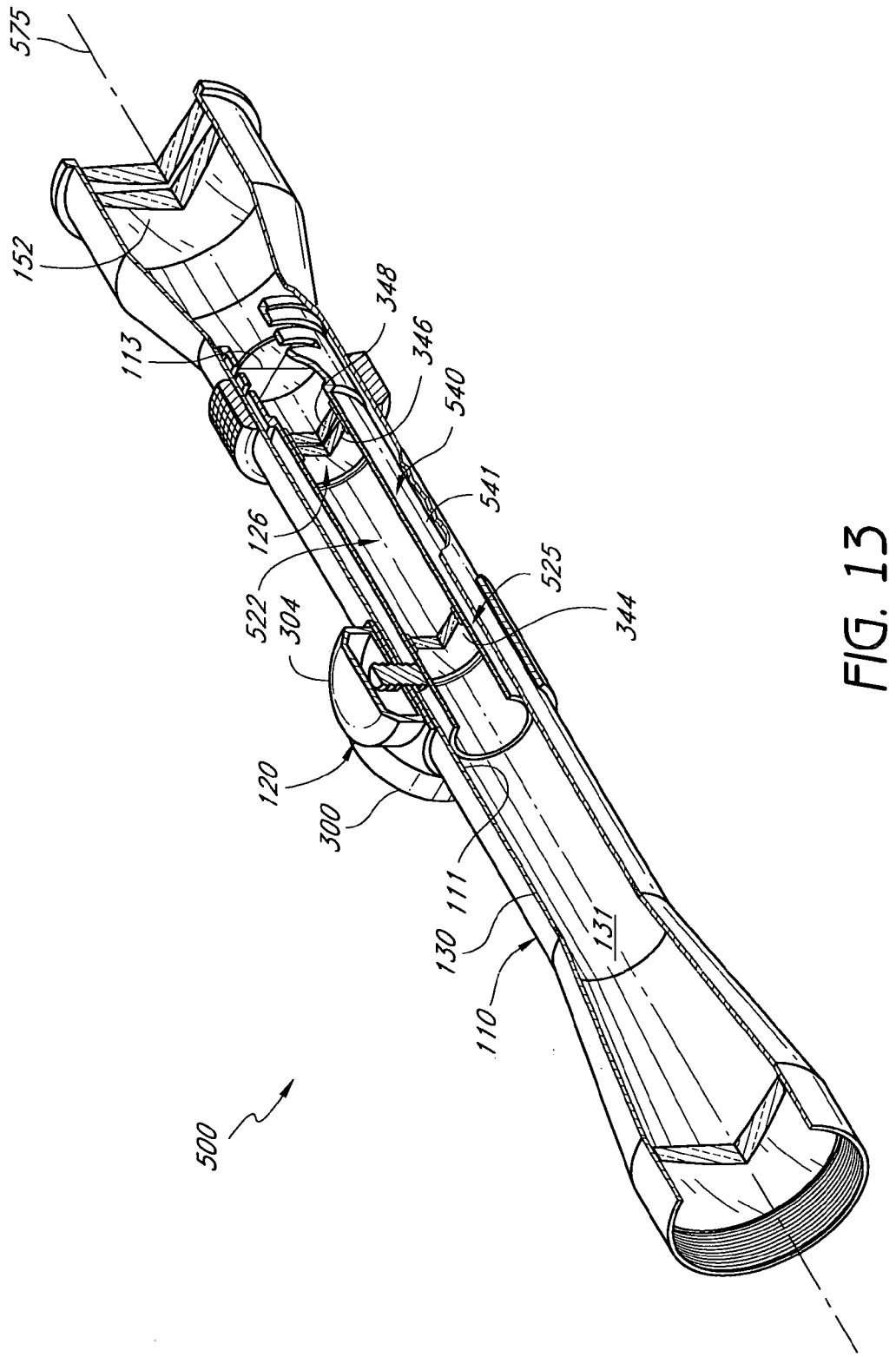
FIG. 13 is a perspective cutaway view of a scope schematically illustrating a flexible erector assembly in the scope.

Another advantageous feature that may be incorporated in the scope design is illustrated in FIG. 13, which shows a scope 500 that has a flexible erector assembly 522 that cooperates with the positioning system 120 to laterally align the optical train 126. This flexible erector assembly 522 flexes in response to adjustments to the windage and elevation actuators 300, 304.

As shown in FIG. 13, the flexible erector assembly 522 comprises an erector housing 525 that contains the optical train 126 that inverts images to ensure that the viewer observes erect, properly oriented images through the scope 500. In the embodiment depicted in FIG. 13, this erector housing 525 comprises a flexible erector tube 540. In various preferred embodiments, the erector tube 540 houses one or more optical lens, such as the lens elements 344, 346, 348.

Although not illustrated, the scope 500 may include other components such as for example a zoom assembly similar to the zoom assembly 103 described above. The erector tube 540 may for example have slots or cams (see the outer tube 340 illustrated in FIG. 9) that convert rotation movement of a zoom selection ring into longitudinal translation of optics in the optical train 126. The one or more cams may be configured to receive and engage one or more carriages similar to the carriages 353, 359 described above. An inner tube like the inner tube 354 discussed above in connection with FIG. 9 may be included to guide the movement of the carriage or carriages. Alternatively, the scope 500 can have other types of zoom arrangements or may have no zoom capability.

As illustrated in FIG. 13, the flexible erector tube 540 is disposed in the hollow interior region or channel 131 within the main body 110 of the scope 500. The flexible erector tube 540 extends from the positioning system 120 to a location proximal to the ocular lens 152. The central tubular body 130 of the main body 110 has interior sidewall surfaces 111 defining the hollow interior region 131. Similarly, the erector tube 540 has exterior sidewall surfaces 541. The exterior sidewall surfaces 541 of the erector tube 540 move with respect to the interior sidewall surfaces 111 of the main body 110, for example, as the flexible erector tube 540 is laterally displaced as discussed more fully below.

Figure 14:
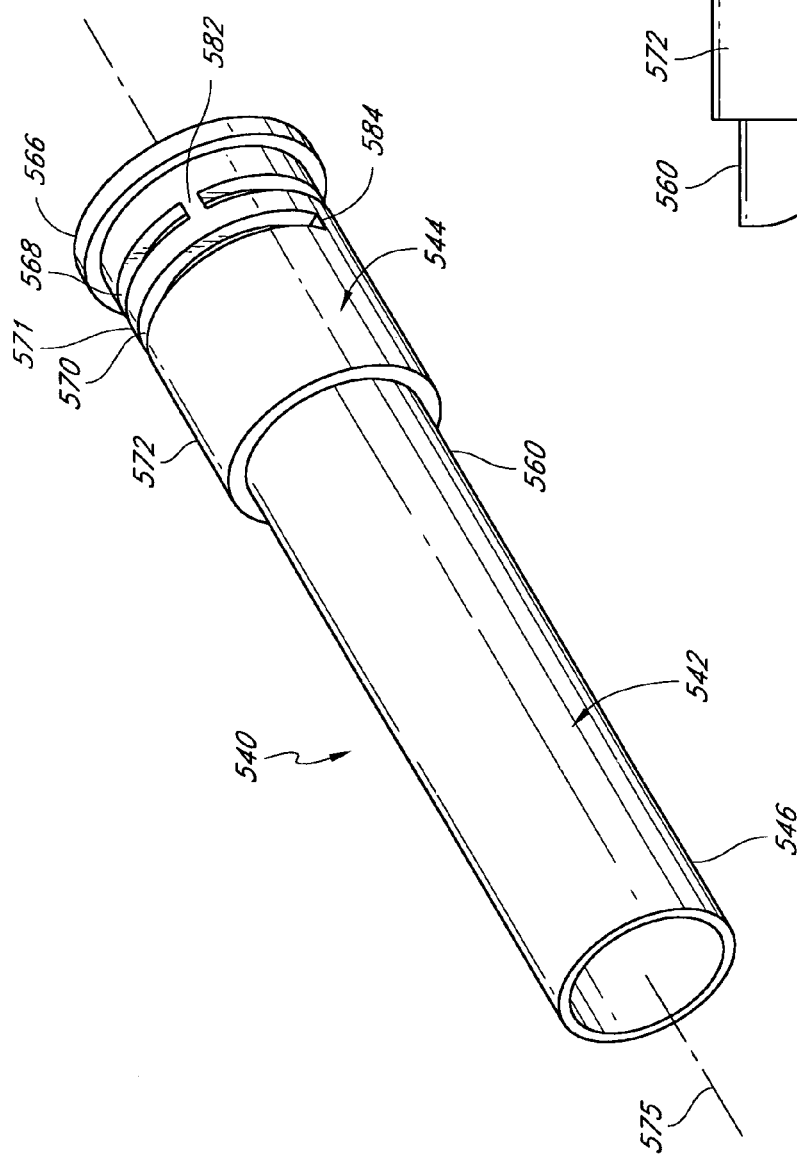
FIG. 14 is a perspective view of an erector tube comprising an elongate and a flexible portion.
Figure 15:
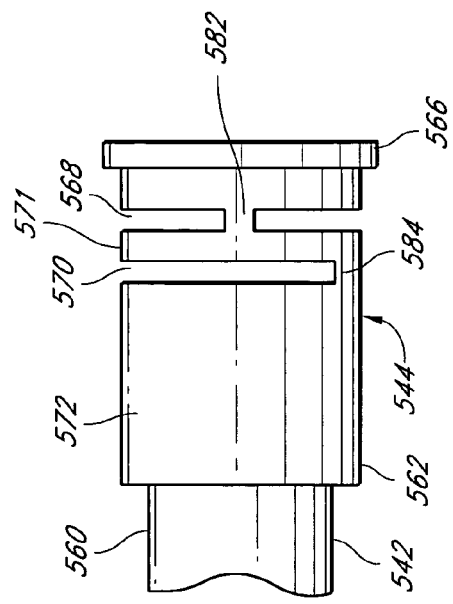
FIG. 15 is a side view of the flexible portion of the erector tube schematically illustrating a plurality of cutouts for providing flexure and a mounting flange tube for affixing the erector tube to the main body of the scope.

As illustrated in FIG. 14, the flexible erector tube 540 comprises an elongate portion 542 connected to a flexible portion 544. In the embodiment shown, the elongate portion 542 comprises a generally rigid cylindrical tube configured to fit within the main body 110 of the scope 500 and that is engaged by the positioning system 120. A distal end 546 of the elongate portion 542 is positioned along the main body 110 such that the screws of the positioning system 120 can contact the distal end 546. As illustrated in FIGS. 14 and 15, the elongate portion 542 has a proximal end 560 that is coupled to the flexible portion 544 of the tube. Other designs are possible. For example, the elongate portion 542 may be shaped differently and may be at least partially flexible in some embodiments. One of ordinary skill in the art may also determine the appropriate combination of material type, thickness, and length of the elongate portion 542 to achieve the desired structural properties resulting in controlled alignment of the optical train 126 during operation of the scope 500.

The flexible portion 544 provides localized flexure such that the erector tube 540 operates like a cantilevered spring. In various preferred embodiments, the flexible portion 544 has sidewalls that are generally less rigid than the elongate portion 542, thereby permitting more flexure of the flex portion 544 than the elongate portion 542. In the illustrated embodiment, the flex portion 544 includes a mounting flange 566 as well as first and second cut-outs 568, 570. The mounting flange 566 is at the proximal end of the flexible portion 544. A cylindrical body 572 of the flexible portion 544 extends distally from the mounting flange 566 and defines the spaced apart cut-outs 568, 570. The cut-outs 568, 570 reduce the rigidity of the flex portion 544 to permit flexure induced by adjustment of the elevational dial 304 and/or the windage dial 300.

The pair of cut-outs 568, 570 may permit flexure of the flexible portion 544 in one or more directions. In the embodiment shown in FIGS. 14 and 15, the first cut-out 568 defines a connecting first portion 582 while the second cut-out 570 defines a second connecting portion 584. An annular member 571 is interposed between the cut-outs 568, 570 and is connected to the connecting portions 582, 584. The first and second connecting portions 582, 584 are adapted to flex when the user adjusts the positioning system 120 thereby applying one or more forces to the erector tube 540. The cut-outs 568, 570 and connecting portions 582, 584 can cooperate to permit movement of the flexible portion 544 in generally orthogonal directions. The positioning system 120, however, can shift the erector tube 540 in any desired direction. The first and second connecting portions 582, 584 can be angularly spaced from each other about a central longitudinal axis 573 through the erector tube 540. The number of connecting portions 582, 584 need not be limited to two. The material and thickness of the flexible portion 544 as well as the length and the width of the connecting portions 582, 584 can be selected to achieve the desired structural properties of the flexible portion 544. For example, the width of the connecting portion 582 can be increased or decreased in size to increase or decrease, respectively, the rigidity of the flexible portion 544. Other designs are also possible.

The flexible portion 544 is secured to the main body 110 with the mounting flange 566. In the embodiment shown in FIG. 13, for example, the mounting flange 566 is secured to the main body 110 while at least part of the elongate portion 542, preferably a section or sections of the elongate portion 542 holding one or more lens elements, is permitted to move in response to a force applied by the windage or elevation actuators 300, 304. Accordingly, the mounting flange 566 and the elongate portion 542 are referred to herein as fixed and movable portions, respectively.

The mounting flange 566 is configured to cooperate with the main body 110 of the scope 500. For example, the interior surface 111 of the main body 110 may include a recess or channel that is configured to receive at least a portion of the mounting flange 566. The mounting flange 566 can remain securely affixed to the main body 110 so that generally the mounting flange 566 does not move relative to the main body 110 during operation of the positioning system 120. It is contemplated that a wide variety of arrangements can be employed to couple the erector tube 540 and the main body 110. Pins, ridges, threads, mechanical fasteners (e.g., nut and bolt assemblies), as well as other arrangements can be used to secure the erector tube 540 to the main body 110.

One-piece construction of the elongate tube 540 wherein the elongate portion 542 is integrally formed with the flexible portion 544 may offer advantages such as durability and reduced wear. The erector tube 540 may for example comprise a continuous, unitary generally tubular body that includes the elongate and flexible portions 542, 544. In such embodiments, the elongate portion 542 and/or the flex portion 544 of the erector tube 540 may be formed by machining, including but not limited to, laser cutting or machining techniques. Alternatively, casting or molding may be employed. Other methods of fabrication may also be used. In other embodiments, for example, the elongate portion and the flex portion 544 may be bonded, welded, or fused together.

The erector tube 540 may also comprise two or more pieces corresponding to the elongate portion 542 and the flexible portion 544 that are mechanically joined together to form the erector tube 540. In certain embodiments, for example, the proximal end 560 of the elongate portion 542 can be received within the distal end 546 of the flex portion 544 and affixed therein. Any suitable method can be used to secure the erector tube 540 to the flexible portion 544. For example, the erector tube 540 can be press fit, threadably coupled, or otherwise affixed to the flexible portion 544. Connectors may be employed in certain embodiments. Other methods of forming the erector tube 540 are possible as well.

When utilizing such a scope 500, the user can adjust the positioning system 120 to move the erector tube 540 to a desired position. The user can rotate the windage dial 300 which, in turn rotates the corresponding windage screw and laterally shifts the distal end 546 of the erector tube 540. The connecting portion 582 flexes and the distal end 546 is moved horizontally.

Similarly, the user can rotate the elevational dial 304 which, in turn rotates the corresponding elevation screw and vertically shifts the distal end 546 of the erector tube 540. The connecting portion 584 can flex as the distal end 546 is moved vertically.

Thus, as the screws of the dials 300, 304 are advanced through the main body 110, the screws can press upon the distal end 546 of the erector tube 540 to cause flexure of the flexible portion 544 of the erector tube 540. The optical train 126 is thereby moved to account for windage and/or elevation. Other methods of laterally translating the erector tube 540 and adjusting the optics train 126 are possible.

Figure 16:
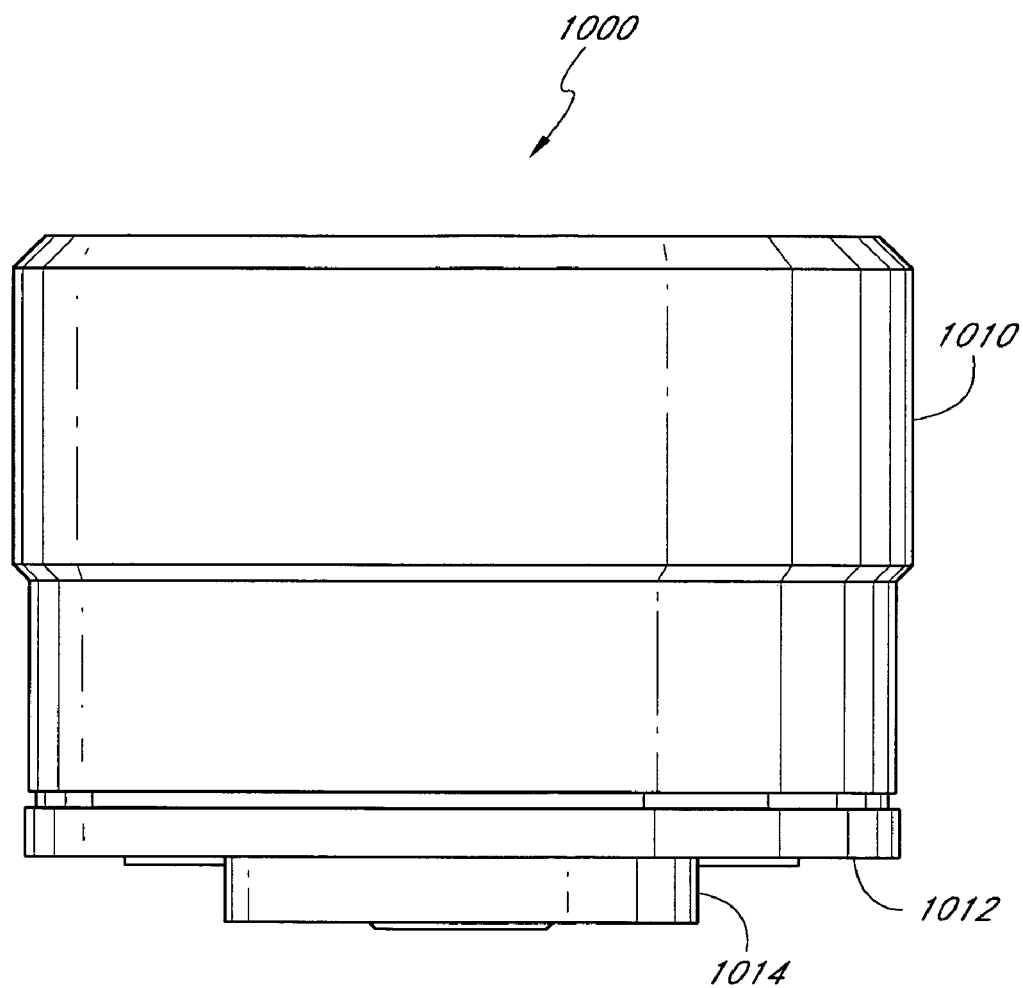
FIG. 16 is a side view of an adjustment mechanism for windage or elevational adjustment.

FIG. 16 illustrates one embodiment of an adjustment mechanism 1000 of a positioning system, such as the positioning system 120 described above. The adjustment mechanism 1000 can form the windage dial 300 and/or elevation dial 304, or other control mechanism of the scope. The adjustment mechanism 1000 preferably enables resetting and/or re-zeroing the settings of the scope.

A cover 1010 may be placed over the adjustment mechanism 1000. This cover 1010 may be removably disposed on a mounting platform 1012. The cover 1010 is preferably threadably coupled to the mounting platform 1012 so that the cover 1010 can be easily removed. The cover 1010 can otherwise be secured to the platform 1012, such as using a snap fit, for example. Optionally, the cover 1010 can be fastened to another component of the adjustment mechanism 1000. The cover 1010 protects the internal components of the adjusted mechanism 1000 from contaminants or external forces that could adversely affect the mechanism 1000.

Figure 17:
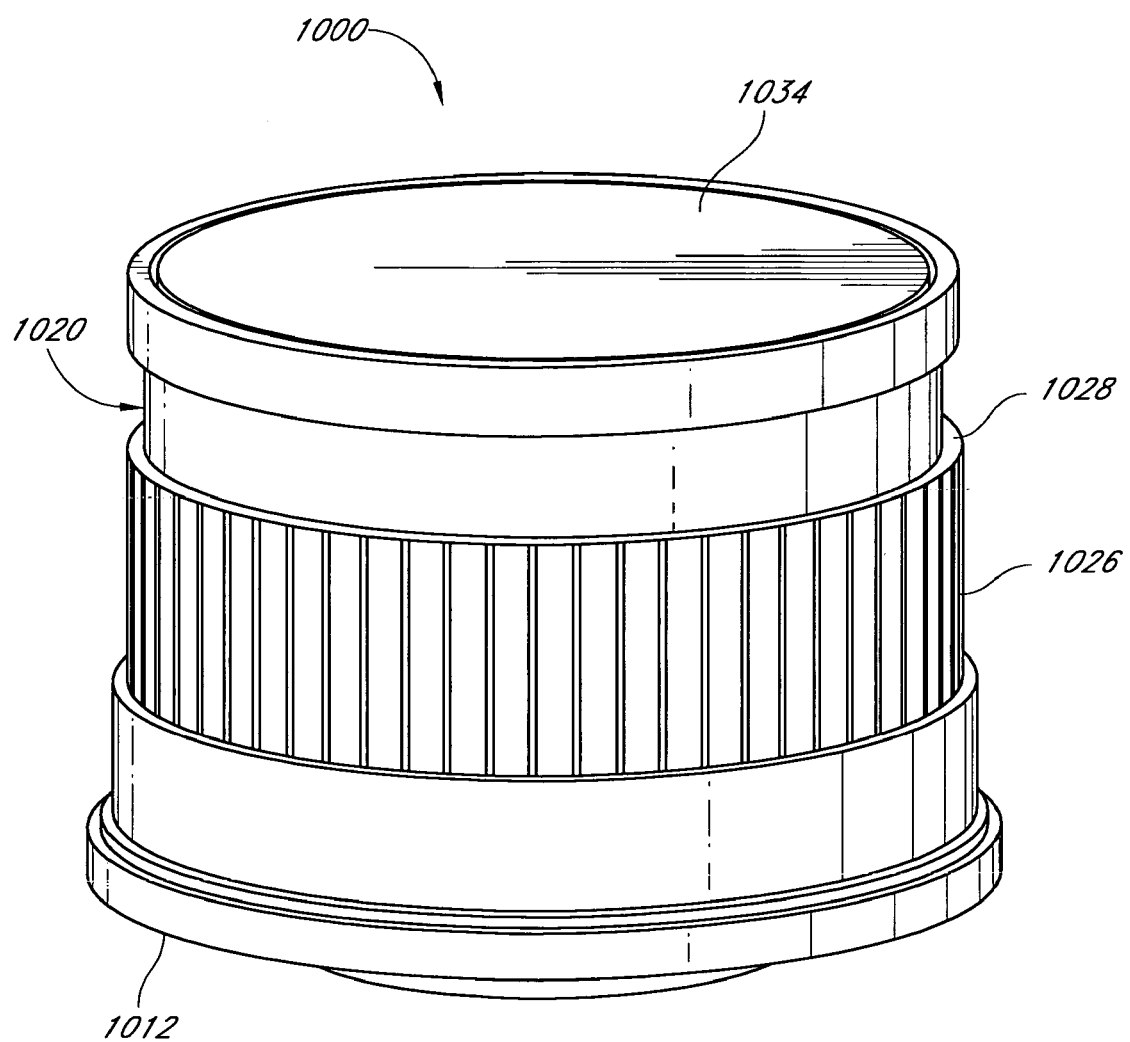
FIG. 17 is a perspective view of the adjustment mechanism of FIG. 16 with a cover removed.

The mounting platform 1012 is configured to be mounted onto on the scope. A mounting portion 1014 of the platform 1012 is configured to be coupled to a scope main body, such as the main body described above. The adjustment mechanism 1000 as seen in FIG. 17 with the cover removed comprises an adjustment dial or knob 1020 and a base 1026, as shown in FIG. 17. The base 1026 is preferably attached to the platform 1012. The base 1026 can be integrally formed with the platform 1012, or can be a separate piece that is coupled to the platform 1012 with adhesives, fasteners (e.g., screws or bolts), threads, and/or the like. The base 1026 is a generally annular structure that surrounds and receives a portion of the adjustment knob 1020.

The adjustment knob 1020 preferably extends outwardly from an upper end 1028 of the base 1026. The adjustment knob 1020 is slidably disposed within the base 1026. The adjustment knob 1020 can be rotated relative to the base 1026 and the platform 1012 in order to affect the optics of the scope. An upper surface 1034 on the adjustment knob 1020 preferably has indicia (e.g., markings) to provide information to a user regarding the settings of the adjustment mechanism 1000.

Figure 18:
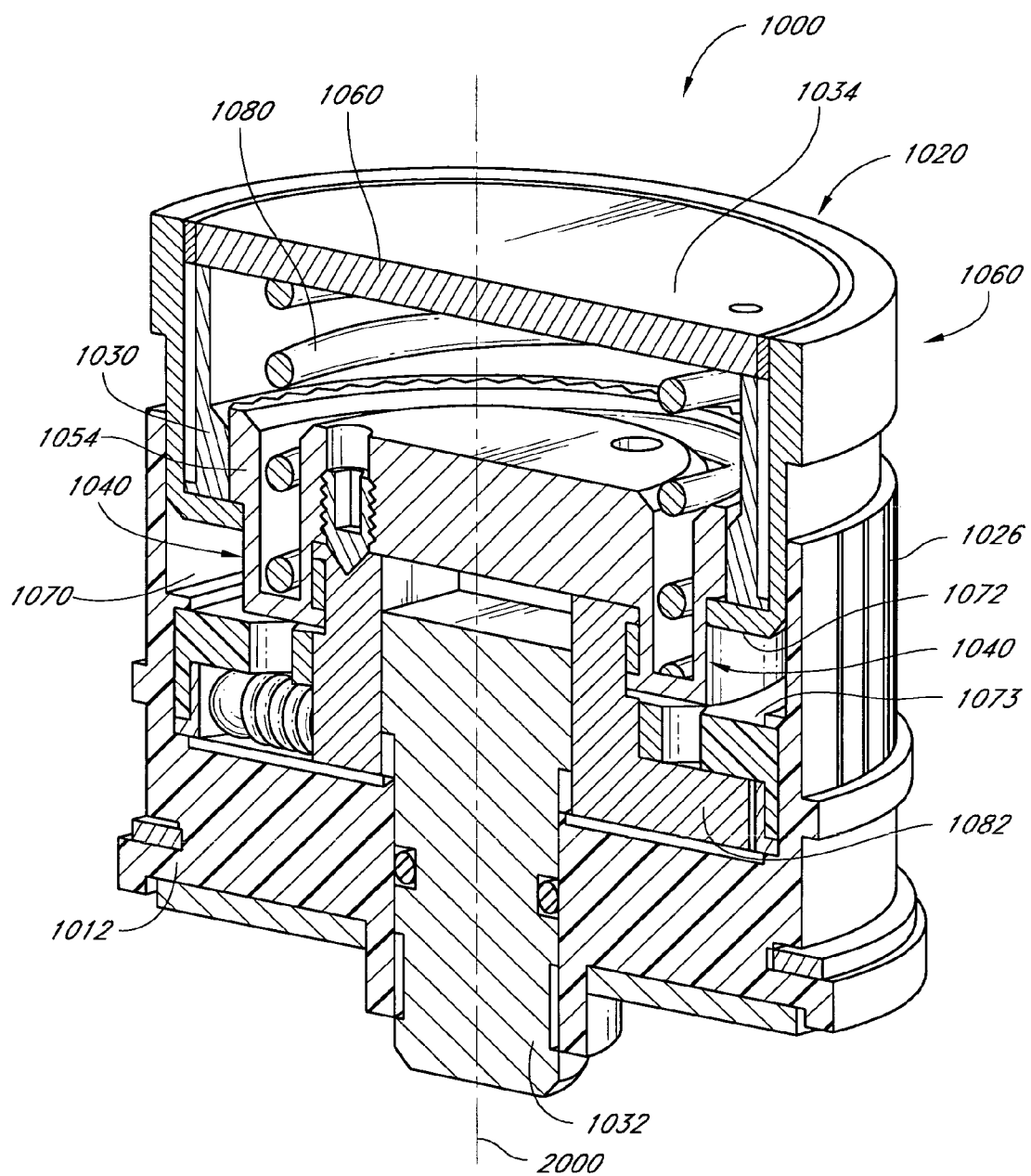
FIG. 18 is a perspective cross-sectional view of the adjustment mechanism of FIG. 16 in an engaged position.

FIG. 18 is a cross-sectional view of the adjustment mechanism 1000. The adjustment mechanism 1000 includes a central drive assembly 1040 surrounded by the adjustment knob 1020 and the base 1026. The central drive assembly 1040 (or drive assembly) is secured to and drives a threaded member 1032 such as an adjustment screw centrally located in the adjustment system 100. The adjustment mechanism 1000 is operated to actuate the adjustment screw 1032 in order for example to move an end of an erector, preferably the distal end 546 of the erector tube 540, as described above.

The adjustment mechanism 1000 can be operated to provide precise and controlled movement of the adjustment screw 1032 to introduce windage and/or elevation adjustments. The adjustment knob 1020 can be rotated to drive the adjustment screw 1032 upwardly or downwardly. The adjustment screw 1032 can be moved longitudinally between the illustrated zero position to the extended position, shown in phantom in FIG. 20.

The adjustment knob 1020 is in an engagement position in FIG. 18 such that the adjustment knob can impart rotary motion to the drive assembly 1040 which, in turn, drives the adjustment screw 1032. As will be discussed more fully below, the adjustment knob 1020 can be depressed into the base 1026 so that the adjustment knob 1020 can freely rotate without causing movement of the adjustment screw 1032.

As shown in FIG. 18, the adjustment knob 1020 and drive assembly 1040 have complimentary locking structures 1030, 1054 such as gears, threads, or the like. The illustrated adjustment knob 1020 has an engagement structure 1030 in the form of a gear configured to mate with a complementary gear portion 1054 of the drive assembly 1040. In the illustrated embodiment, the engagement gear 1030 and the gear portion 1054 have teeth configured and designed to mate so that rotation of the adjustment knob 1020 imparts rotary motion to the drive assembly 1040. The engagement gear 1030 and the gear portion 1054 can be generally annular bodies. Preferably, the engagement gear 1030 is integrally formed with or fixedly attached to the adjustment knob 1020.

The adjustment knob 1020 can have an upper end 1060 that defines the upper surface 1034 and is preferably slidably disposed within a chamber 1070 that is between the base 1026 and the drive assembly 1040. When the adjustment knob 1020 is in the engagement position, as shown in FIG. 18, a bottom surface 1072 of the adjustment knob is preferably separated from an intermediate inner surface 1073 of the base 1026 referred to herein as a stop. The adjustment knob 1020 can be slid towards the base 1026 until the bottom surface 1072 of the adjustment knob 1020 contacts the stop 1073 on the base 1026 in certain embodiments as discussed more fully below.

With continued reference to FIG. 18, the drive assembly 1040 is configured to mechanically connect the adjustment knob 1020 and the adjustment screw 1032. The gear portion 1054 is attached to the drive assembly 1040 which may also include a lower member 1082. In some embodiments, for example, the drive assembly 1040 is a multi-piece construction wherein the lower member 1082 is secured by screws, for example. Alternatively, the gear portion 1054 and the lower member 1082 are integrally connected to form the drive assembly 1040.

Figure 19:
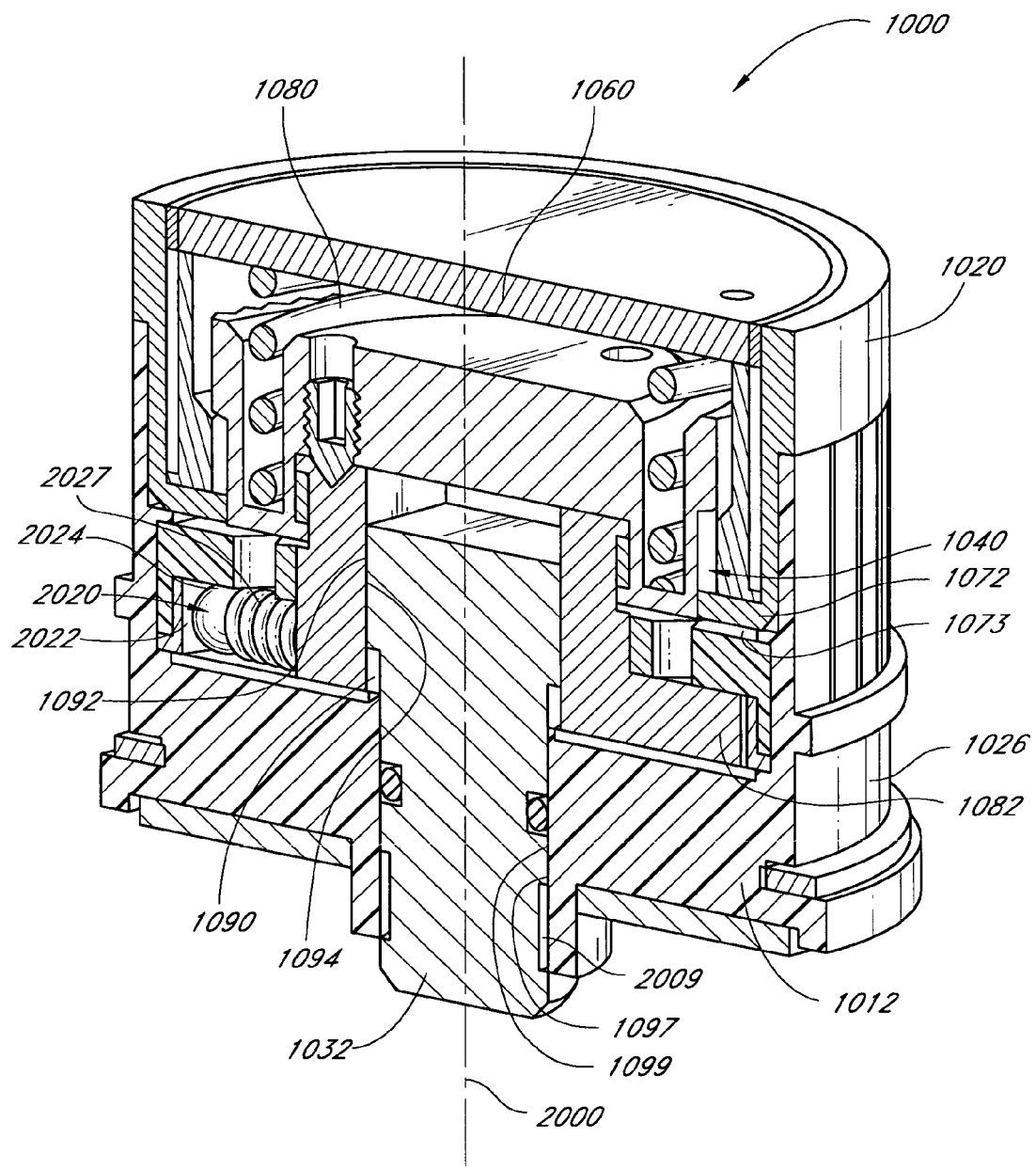
FIG. 19 is a perspective cross-sectional view of the adjustment mechanism of FIG. 16 in a disengaged position.

As shown in FIG. 19, a central portion of the drive assembly 1040 preferably comprises a passageway or hole 1090 configured and sized to receive at least a portion of the adjustment screw 1032. The passageway 1090 can be a polygonal (including rounded polygonal) or have any suitable shape for receiving the adjustment screw 1032. In certain preferred embodiments, such as that illustrated in FIG. 19, at least a portion of the passageway 1090 and a portion of the adjustment screw 1032 have a substantially similar shape and size. The illustrated passageway 1090 is generally square in cross-section. Due to the matched shape and size of the passageway 1090 and the adjustment screw 1032 (or portions thereof) and the resultant fit therebetween, rotation of the drive assembly 1040 causes rotation of the adjustment screw 1032.

The platform 1012 also has a passageway or hole 2009 that is aligned with the passageway 1090 in the drive assembly 1040. The passageway 2009 can have internal threads 1097 configured to mate with corresponding external threads 1099 of the adjustment screw. With longitudinal movement of the adjustment screw 1032, the adjustment screw may be advanced into the passageway 2009 in the platform 1012. The threaded connection between the adjustment screw 1032 and the platform 1012 causes rotary motion of the adjustment knob 1020 and drive assembly 1040 to induce longitudinal displacement of the adjustment screw. The threaded connect may also be elsewhere. For example, an opening in the main body 110 through which the adjustment screw 1032 passes may be threaded. The drive assembly 1040 may also comprise a stop 1088 that is configured to limit the upwardly movement of the adjustment screw 1032, e.g., when the adjustment knob 1020 is rotated so as to retract the adjustment screw 1032 from the passageway 2009 in the platform 1012.

The adjustment mechanism 1000 preferably comprises one or more indexing systems 2020 that allows for precise controlled rotation of the adjustment knob 1020 for control of the adjustment screw 1032. The indexing system 2020 can provide tactile feedback to the user when the user rotates the adjustment knob 1020 to allow for precise actuation of the adjustment screw 1032. In some embodiments, the indexing system 2020 comprises is a click ring/ball assembly having a click ring 2022 and a ball and spring assembly 2024 (e.g., a helical spring that is sized to bias the ball outwardly towards the click ring 2022). A chamber 2027 is configured to receive the click ring 1022 and the ball and spring assembly 2024. The ball is displaced inwardly and outwardly repeatedly as the drive assembly 1040 rotates about the axis 2000, thereby driving the adjustment screw 1032. The internal periphery of the click ring 2022 may comprise recesses, teeth, grooves, and/or other structures that are suitable for receiving at least a portion of the indexing system 2020. The indexing system 2020 can have an audible click system (e.g., a ¼ or ⅛ minute audible click system) to provide precise tactical feedback to the user. Different configurations and designs are also possible.

As shown in FIGS. 18 and 19, a biasing member 1080 is positioned between the drive assembly 1040 and the upper end 1060 of the adjustment knob 1020. The biasing member 1080 can be a biasing member for applying a force to a surface on the upper end 1060 so that the adjustment knob 1020 remains in the engagement position (see FIG. 18) as the adjustment knob 1020 is rotated. The illustrated biasing member 1080 includes a helical spring or other suitable structure for forcing the adjustment knob 1020 away from the base 1026. Alternative embodiments can employ other known mechanisms for actuating or biasing the adjustment knob 1020, such as an actuating mechanism, a plurality of springs, and the like.

As shown in FIG. 18, the biasing member causes the complimentary gears 1030, 1054 to interlock. The adjustment knob 1020 is in the engagement position such that the engagement gear 1030 is engaging the gear portion 1054. Accordingly, when the gear portion 1054 rotates about the axis of rotation 2000 of the adjustment mechanism 1000, the gear portion 1054 and the lower member 1082 rotate together. As drive assembly 1040 rotates, the adjustment screw 1032 is driven upwardly or downwardly depending on the design.

To reset the windage and/or elevation, the user can press downwardly on the upper end 1060 of the adjustment knob 1020 depressing the adjustment knob to disengage the gears 1030, 1054 as illustrated in FIG. 19. When the adjustment knob 1020 is moving downwardly, the drive assembly 1040 preferably remains substantially stationary. The indexing system 2020, for example, can inhibit or limit the rotational movement of a drive assembly 1040. Once the adjustment knob 1020 reaches the fully depressed position (as shown in FIG. 19), the gears 1030, 1054 are disengaged, and the adjustment knob 1020 can rotate freely about the axis 2000. In other words, when the adjustment knob 1020 is depressed, the adjustment knob 1020 can be rotated about the axis 2000 while the drive assembly 1040, drive screw 1032, base 1026, and platform 1012 remain stationary. Thus, the depressed adjustment knob 1020 can freely spin about the axis 2000 to reset the adjustment knob 1020.

Figure 20:
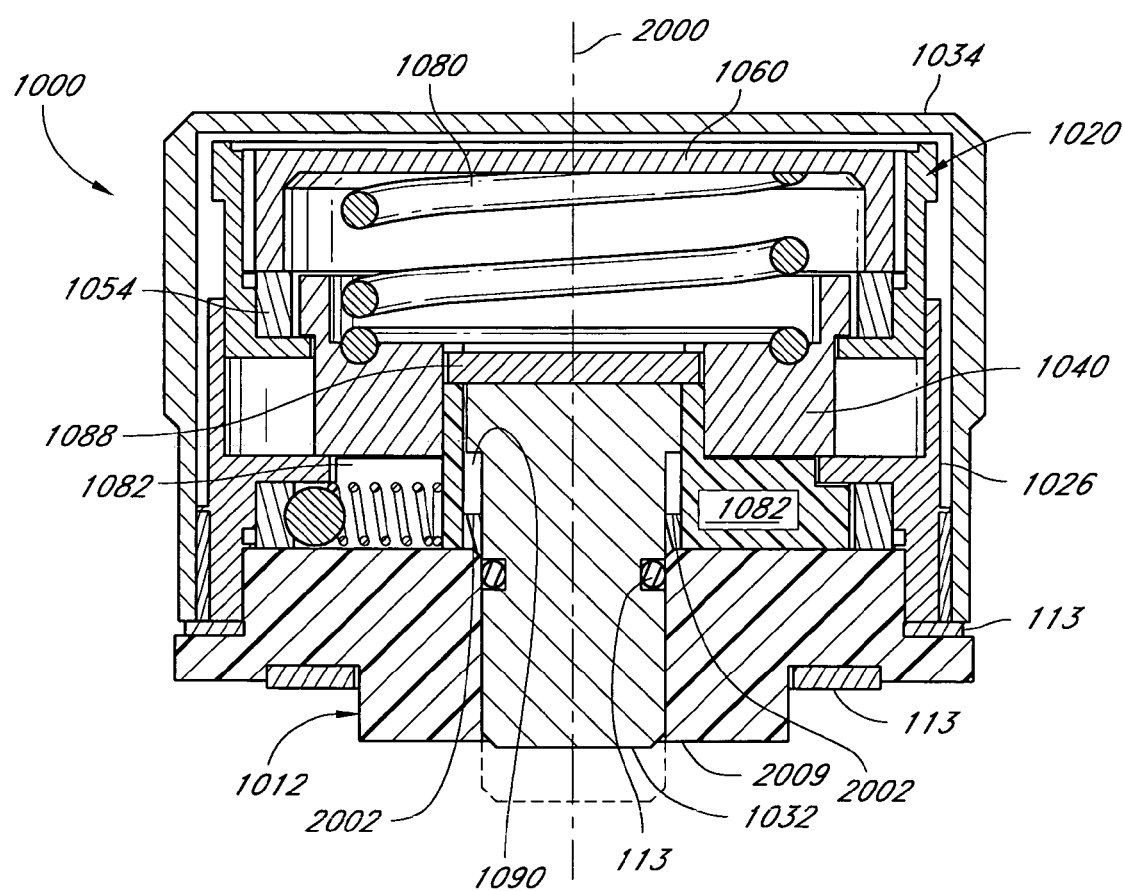
FIG. 20 is a cross-sectional view of another embodiment of the adjustment mechanism.

FIG. 20 shows a slightly different embodiment also in the engaged position. The adjustment knob 1020 could be depressed to disengage the adjustment knob from the drive assembly 1040 and the adjustment screw 1032. In the embodiment shown in FIG. 20, the adjustment screw 1032 has stops 2002 that contact the platform 1012 to limit the downwardly travel of the adjustment screw 1032. Thus, the adjustment screw 1032 has a length of travel that may be defined by the stops 1088 and 2002. The adjustment screw 1032 can move axially along the passageways 1090, 2009 at it rotates. A skilled artisan can select the length of the adjustment screw 1032 and the distance that the adjustment screw travels to achieve the desired adjustment functionality.

The adjustment assembly 1000 optionally comprises a plurality of seals 113 that protect the internal components of the adjustment assembly 1000. Any number of suitable seals can be placed throughout the adjustment assembly 1000 to prevent contaminants from adversely affecting moving components. The seals 113 can inhibit and prevent contaminants (e.g., moisture, dust, and the like) from entering the adjustment assembly 1000. For example, a seal 113 can be formed between the adjustment screw 132 and the passageway 2009. Any suitable seal type can be employed, such as an o-ring or annular sealing member. Another seal 113 can be positioned between the platform 112 and the scope main body (not shown). In certain embodiments, however, the platform is integral with the scope main body and may be connected by molding or welding.

In operation, embodiments of the adjustment knob 1020 can be employed for controlling the desired windage or elevation setting. The adjustment knob 1020 can be used for windage and/or elevation adjustments, preferably made, e.g., after bore sighting the riflescope to compensate for winds and to adjust for different bullet weights and/or powder loads. Resetting the adjustment knob 1020 to zero, or another position, e.g., after bore sighting allows the user to accurately record windage and/or elevational compensations that may be required.

To reset the adjustment settings, the adjustment knob 1020 is pushed downwardly on the knob and rotates freely to a desired setting. The adjustment knob 1020 can be easily depressed with a person's finger, palm, etc. Many times, a person may be wearing clothing or protective gear, such as gloves, that may make it difficult to grip items. Advantageously, a person can conveniently apply a force to the adjustment knob 1020 to cause actuation. Upon release, the biasing member 1080 pushes the adjustment knob 1020 back to the engagement position. Thus, the adjustment knob 1020 does not have to be gripped to move the adjustment knob 1020 between the engagement and disengagement position. Of course, a person can grip the knob 1020 during operation.

The user may reset the windage and/or elevation for different reasons. As described above, the windage and elevation controls may include indicia or an indicator that indicates the windage and elevation setting. This indicator may be set to zero once the proper windage/elevation adjustment has been established. For example, a user may determine what windage and elevation settings provide for accurate shooting and may reset the windage and elevation knobs such that the windage and elevation indicators indicate a zero position. The user may be interested in shooting a farther distance and thus may want to change the elevation. The user may adjust the elevation and may reset the knob again back to zero for continuous shooting at that distance. The windage and elevation reset can be used on other ways. The user can reset the windage and elevation controls to different settings (e.g., non-zero values). Disengaging the windage and elevation knobs and resetting may be used for other reasons as well.

As described above, the design and configuration of the scope including, for example, the positioning system, can be different. In fact, a wide variety of variations are possible. For example, the shape and contour the scope and its components may be different to provide a different look and/or feel. Internal features may also be configured differently. For example, a flexible erector tube need not be used. Other configurations can provide for movement of the erector assembly. Different types of mechanical connections may be used in the scope. The positioning system may be different. For example, in other embodiments, the adjustment screw 1040 shown may be excluded and other types of threaded or non-threaded members may be used instead.

Moreover, additional components can be added, components can be removed, arranged or configured differently, in the scope as well as in the position system of the scope. Similarly, the methods which are described and illustrated herein are not limited to the exact sequence of acts described, nor is it necessarily limited to the practice of all of the acts set forth. Other sequences of events or acts, or less than all of the events, or simultaneous occurrence of the events, may be utilized in practicing the embodiments of the invention. Additional events or acts may be added. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A scope adapted to be mounted on a firearm, comprising:
   (a) a main tube, having a longitudinal orientation;
   (b) imaging optics in said main tube, including a reticle that is visible to a user looking through said scope and that has an apparent position relative to said main tube longitudinal orientation;
   (c) a reticle apparent position adjustment assembly, including a user accessible actuator, wherein when said adjustment assembly is in a first state, movement of said actuator causes said apparent position of said reticle to change relative to said main tube longitudinal orientation;
   (d) wherein markings are associated to said actuator and wherein one said marking indicates a zero position for said actuator;
   (e) an actuator disengagement mechanism, adapted to permit a user to place said adjustment assembly into a second state in which movement of said actuator does not cause said apparent position of said reticle to change relative to said main tube orientation; and
   (f) whereby a user may use said actuator in said first mode to move said apparent reticle position to a generally advantageous position, place said position adjustment assembly into said second state, move said actuator to said zero position and place
   said position adjustment assembly back into said first state, whereby movement of said reticle may be made relative to said generally advantageous apparent reticle position which has been set to correspond to said actuator zero position.

2. The scope of claim 1, wherein said actuator is a knob.

3. The scope of claim 1, wherein said actuator is a windage actuator.

4. The scope of claim 1, wherein said actuator is an elevation actuator.

5. The scope of claim 3, wherein said scope includes an elevation actuator, in addition to said windage actuator.

6. The scope of claim 1, wherein moving said actuator in said first state changes the position of a portion of said imaging optics.

7. The scope of claim 1, wherein moving said actuator in said first state, causes said actuator to move an element transversely to said main tube longitudinal orientation and presses transversely against a portion of said imaging optics, transversely moving said portion of said imaging optics.

8. The scope of claim 7, wherein said actuator is a knob that is engaged to a threaded member and rotating said knob, in said first state, causes said threaded member to move transversely relative to said longitudinal orientation of said main tube.

9. The scope of claim 8, wherein in said second state said knob is disengaged from said threaded member.

10. The scope of claim 2, wherein said knob is pushed in to place said adjustment mechanism into said second state.

* * * * *